(12) United States Patent
Shanks et al.

(10) Patent No.: US 11,303,880 B2
(45) Date of Patent: Apr. 12, 2022

(54) NEAR EYE WAVEFRONT EMULATING DISPLAY

(71) Applicant: Manor Financial, Inc., Herndon, VA (US)

(72) Inventors: Mark Shanks, Baltimore, MD (US); Andrew Kemendo, Cheverly, MD (US)

(73) Assignee: Manor Financial, Inc., Herndon, VA (US)

( * ) Notice: Subject to any disclaimer, the term of this patent is extended or adjusted under 35 U.S.C. 154(b) by 0 days.

(21) Appl. No.: 16/932,011

(22) Filed: Jul. 17, 2020

(65) Prior Publication Data

US 2021/0144361 A1 May 13, 2021

Related U.S. Application Data

(63) Continuation of application No. 15/808,729, filed on Nov. 9, 2017, now Pat. No. 10,757,400.

(60) Provisional application No. 62/420,519, filed on Nov. 10, 2016.

(51) Int. Cl.
| | |
|---|---|
| *H04N 13/344* | (2018.01) |
| *G02B 27/01* | (2006.01) |
| *G02B 26/10* | (2006.01) |
| *H04N 9/31* | (2006.01) |
| *H04N 13/383* | (2018.01) |

(52) U.S. Cl.
CPC ........... *H04N 13/344* (2018.05); *G02B 26/10* (2013.01); *G02B 26/106* (2013.01); *G02B 27/0172* (2013.01); *H04N 9/3129* (2013.01); *H04N 9/3188* (2013.01); *H04N 13/383* (2018.05); *G02B 2027/0125* (2013.01); *G02B 2027/0134* (2013.01); *G02B 2027/0178* (2013.01)

(58) Field of Classification Search
CPC .. H04N 13/344; H04N 13/383; H04N 9/3188; H04N 9/3129; H04N 13/302; H04N 13/305; G02B 2027/0125; G02B 2027/0178; G02B 2027/0134
See application file for complete search history.

(56) References Cited

U.S. PATENT DOCUMENTS

| | | | | |
|---|---|---|---|---|
| 5,343,313 | A * | 8/1994 | Fergason | A61F 9/023 2/6.3 |
| 6,160,667 | A * | 12/2000 | Smoot | G02B 27/0172 345/7 |
| 6,747,612 | B1 * | 6/2004 | Knox | G02B 27/0101 345/102 |
| 2004/0085617 | A1 * | 5/2004 | Helsel | G02B 26/0841 359/292 |

(Continued)

*Primary Examiner* — Jefferey F Harold
*Assistant Examiner* — Timothy R Newlin
(74) *Attorney, Agent, or Firm* — Nixon & Vanderhye P.C.

(57) ABSTRACT

A near eye display device includes a sparse array of intensity modulated light beam emission and steering points disposed on a transparent lens, capable of forming a wide field of view composite image directly on the retina with variable degrees of apparent depth controlled by an image forming timing signal. The active regions of the beam emission and steering elements is configured so as not to generate optical aberrations of transmitted ambient light that is apparent to the eye. The display may be applied to small form factor stereoscopic head worn display systems and used in conjunction with Augmented Reality software applications.

16 Claims, 15 Drawing Sheets

(56) References Cited

U.S. PATENT DOCUMENTS

| | | | |
|---|---|---|---|
| 2005/0036109 A1* | 2/2005 | Blum | G02B 27/0172 351/159.03 |
| 2006/0028400 A1* | 2/2006 | Lapstun | H04N 13/344 345/8 |
| 2006/0232665 A1* | 10/2006 | Schowengerdt | G02B 27/0093 348/51 |
| 2007/0252953 A1* | 11/2007 | Metzger | G02B 30/35 353/7 |
| 2008/0117289 A1* | 5/2008 | Schowengerdt | G02B 26/005 348/46 |
| 2009/0147331 A1* | 6/2009 | Ashkenazi | G02B 5/32 359/13 |
| 2009/0189830 A1* | 7/2009 | Deering | H04N 13/383 345/1.3 |
| 2010/0149073 A1* | 6/2010 | Chaum | G02B 27/0172 345/8 |
| 2011/0063289 A1* | 3/2011 | Gantz | G03H 1/02 345/419 |
| 2011/0216421 A1* | 9/2011 | Shirasaki | G02B 25/007 359/629 |
| 2013/0113973 A1* | 5/2013 | Miao | G09G 3/003 348/333.01 |
| 2013/0201080 A1* | 8/2013 | Evans | G02B 26/0833 345/8 |
| 2014/0036361 A1* | 2/2014 | Woodgate | G02F 1/011 359/466 |
| 2014/0049983 A1* | 2/2014 | Nichol | G02B 6/0028 362/610 |
| 2014/0347736 A1* | 11/2014 | Liu | G02B 27/0172 359/630 |
| 2015/0042679 A1* | 2/2015 | Jarvenpaa | G06F 3/0304 345/633 |
| 2016/0026253 A1* | 1/2016 | Bradski | H04N 13/344 345/8 |
| 2016/0195720 A1* | 7/2016 | Travis | G03H 1/265 345/8 |
| 2016/0267720 A1* | 9/2016 | Mandella | G06F 1/1686 |
| 2017/0038589 A1* | 2/2017 | Jepsen | G09G 3/3426 |
| 2017/0171533 A1* | 6/2017 | Benitez | G02B 30/27 |
| 2017/0205877 A1* | 7/2017 | Qin | G02B 27/0172 |
| 2017/0248750 A1* | 8/2017 | Curtis | G02B 27/0172 |
| 2018/0025521 A1* | 1/2018 | Allen | G06T 11/001 345/589 |
| 2018/0067306 A1* | 3/2018 | Wilson | H04N 13/344 |
| 2018/0084232 A1* | 3/2018 | Belenkii | H04N 13/324 |
| 2018/0149862 A1* | 5/2018 | Kessler | G02B 26/10 |
| 2018/0292654 A1* | 10/2018 | Wall | G02B 27/0081 |
| 2021/0144361 A1* | 5/2021 | Shanks | G02B 26/106 |

* cited by examiner

NEAR EYE WAVEFRONT EMULATING DISPLAY

CROSS REFERENCE TO RELATED APPLICATIONS

This application is a CON of application Ser. No. 15/808,729 filed Nov. 9, 2017, now U.S. Pat. No. 10,757,400; which claims priority from U.S. Provisional Application No. 62/420,519 filed Nov. 10, 2016, entitled "NEAR EYE WAVEFRONT EMULATING DISPLAY." The content of the aforementioned applications are hereby expressly incorporated by reference into the present application in their entirety.

FIELD OF THE INVENTION

The invention relates generally to near-eye display systems, more specifically to optical see-through Virtual Retinal Display (VRD) systems for Augmented Reality.

BACKGROUND OF THE INVENTION

Head mounted optical see-through displays are a class of device that enable the visual Augmented Reality, referred to herein simply as Augmented Reality (AR). AR is a mode of Human Computer Interaction in which virtual content is overlaid in real-time onto a user's perception of the real environment such that the virtual content appears to be physically present in a scene. However, while many advancements have been made, prior art has failed to provide a display system capable of overlaying high resolution virtual content over the entire range of a user's natural Field of View (FOV) while maintaining a comfortable form factor.

Historically, AR display systems have fallen into two categories: Video See-Through and Optical See-Through. In video see-through systems, an opaque display is mounted over the eye intentionally occluding the user's natural FOV, but is used in conjunction with outward-facing cameras such that a near real-time image of the user's environment is presented to the user. Alternatively, optical see-through displays present an image to the user without occluding the user's natural FOV, which is most commonly achieved by projecting a digital image onto a largely transparent surface such as a half-silvered beam splitter mounted over the eye.

The present invention relates specifically to head-worn AR displays. In both AR display variants, when mounted in a head-worn configuration, the displays are typically accompanied by multiple sensors which detect both aspects of the user's environment and motion of the user within the environment. Sensors may include, but are not limited to Inertial Measurement Units (IMU), single video cameras, Global Positioning Sensors, stereoscopic cameras, plenoptic cameras, laser ranging systems, LIDAR, Time of Flight cameras, Infrared (IR) cameras, Red Green Blue-Depth cameras, etc. The objective of the sensors is to provide input to computer algorithms which can localize the users position and orientation within an environment, as well as generate a virtual model of the environment (i.e. a map) with which virtual content can be aligned. Many algorithms used to achieve this objective, most notably to date are Simultaneous Localization and Mapping (SLAM) and Parallel Tracking and Mapping (PTAM) algorithms. Ongoing research in this field seeks to approach near real-time and deterministic output of tracking and mapping algorithms.

Prior art offers many different approaches to optical see-through near eye display architectures, most commonly image projection onto optical combiner lens, image transmission via holographic waveguide coupling, free-form optic eyepieces with optical compensators. As described in U.S. patent application Ser. No. 13/426,379 entitled "increasing Field of View of Reflective Waveguide" to Robbins et al., the field of view of systems that rely solely on waveguide material properties is inherently limited by the waveguide material critical angle. An alternative to pure optical image relay systems is the scanning Virtual Retinal Display (VRD) as disclosed in the seminal U.S. Pat. No. 5,467,104 entitled "Virtual Retinal Display" to Furness et al. is capable of scanning an image directly onto the retina by modulating the intensity of a collimated light beam in synchrony with the deflected raster scanning of the beam. However, the requirement for intermediary projection optic resulting in an image that converges on the eye pupil, in conjunction with the bulky system architecture near the user's line of sight precludes the practical use of this display for AR applications.

Later derivations of the VRD, such as U.S. Pat. No. 7,365,892 entitled "Scanned Light Display System Using Array of Collimating Elements in Conjunction with Large Numerical Aperture Light Emitter Array" to Sprague et al. disclose a VRD array for the presentation of a tiled image to the eye. However, the architecture requires a dense array of embedded addressable emission points with coupled collimating optics, the presence of which, without costly compensation unaddressed in the art, result in optical aberrations of transmitted ambient light. Thus, while suitable for occluded displays, the architecture precludes its application in near eye optical see-through displays.

Of note, the non-scanning VRD architecture described is U.S. Pat. No. 9,594,247 entitled "System, Method, and Computer Program Product for a Penlight See-Through Near-Eye Display" describes a system for projecting an image from a sparse, thus transparent, array of Lambertian emitters subsequently, the light from which is subsequently filtered by tiled Spatial Light Modulator (SLM). Similar to Sprague's architecture, the requirement for diffractive components of a SLM in the user's line of sight results in unsatisfactory optical aberrations of transmitted light such as double images and rainbow patterns.

Optical see-through devices may display an image a single eye such in the case of "eye-tap" or monocular devices, or they may display a stereoscopic image pair to both eyes in the case of stereoscopic displays. The present invention relates generally to binocular optical see-through systems but may also be applied to monocular systems.

While stereoscopic images are capable of presenting virtual content that appears to be at a specified distance from the user, display systems offered in prior art typically simply present purely collimated images to each eye. To maintain simple architecture, most near eye displays simply strive to maintain collimation of the projective image light that can be easily focused by the eye lens in the relaxed state.

When collimated light from an image display reaches the eye, the light forms a flat wavefront which does not require the eye lens to deform (i.e. accommodate), and a sharply focused image can be formed on the retina. From the eye lens perspective, all light from the display, and hence all image content presented by the display is perceived by each eye individually to be at located at optical infinity (i.e, >about 8 m). However, to emulate a nearby point (e.g. <about 8 m) the stereoscopic image pair will prompt the eyes to rotate inward such that their respective lines of sight converge upon a point. In response, the brain, expecting to receive an incident divergent wavefront sends a signal to the muscles controlling the eye lens (i.e, the accommodation-vergence reflex) to deform appropriately to yield a sharp focused image on the retina. Thus, the application of a stereoscopic pair to present a virtual image of a nearby object without concurrently emulating the natural curvature of the incident wavefront leads to an accommodation-vergence conflict that can be the source of physical discomfort for users and diminishes the realism of displayed 3D content due to the lack of accommodative depth cues.

SUMMARY OF THE INVENTION AND ADVANTAGES

Embodiments of the present invention are directed to devices, methods and systems for facilitating AR applications, although other display applications are possible. In accordance with the present invention, the deficiencies of prior near eye display systems have been overcome.

The near eye display of the present invention employs a lens comprising a sparse array of emission points from which intensity modulated collimated light beams are emitted. Each beam represents an emulated wavefront emanative from a virtual object in the user's FOV. The beams are subsequently scanned by a second beam scanning layer in synchrony with the intensity modulation, over a range of angles covering a portion of the user's field of view to form an image tile. Each beam emission point and coupled scanning element is referred to herein as a "Pinbeam." The projected active area of each Pinbeam and interspacing of the Pinbeam array, is restricted in size using the method disclosed, to eliminate optical aberrations of transmitted ambient light based on the photopic response limitations of the human eye.

In a preferred embodiment, it is assumed that the display system disclosed is receives an image signal from an external source, such as a computing system running AR software producing video images from an electronic file or as a data feed. Upon receipt, the image forming signal is parsed into image tiles allocated to each respective Pinbeam element responsible for displaying content in the corresponding angular envelope of the user's FOV. The image tile signals are transmitted to respective dedicated Pinbeam light sources arranged in an array module and tethered via optical fiber or fibers to the edge of the display tapered waveguide lens. The optical coupling of the fiber or fiber bundle to the display lens is at an appropriate angle such that light beams are transmitted to each Pinbeam position, which redirect and scan the beams via a resonant decentered microlens array toward the exit pupil.

The application of a Pinbeam array across a display lens, filling the space between the eyewear frames, ensures the FOV is constrained only by the eyewear itself. The lack of complex bulky optics supports a display integration into an enclosure having a comfortable form factor typical of standard eye glasses. In another embodiment a curved lens with disposed Pinbeam array may be employed to extend the FOV beyond standard eye glasses form factor. In another embodiment, adjacent Pinbeams are configured to emit light beams at redundant angles to yield an expanded exit pupil.

The use of a remote modulated light source array in the preferred embodiment provides an efficient means of off-loading image processing from the head-worn frames housing the display lens. In another embodiment, the light source array is a micro-emitter array, such as a micro-LED or micro-LCD array embedder in the eyewear itself to support an untethered configuration. In another embodiment, an offset is introduced into the light intensity modulation signal of a redundant Pinbeam to support emulation of a curved wavefront, hence the presentation of virtual content intended to appear at a distance closer than optical infinity to the user.

In another embodiment, the present invention employs foveated imaging to minimize the resolution required per Pinbeam element, hence the entire display system.

These and other objects, advantages and novel features of the present invention as well as details of an illustrated embodiment thereof, will be more fully understood from the following description, claims and drawings.

BRIEF DESCRIPTION OF THE DRAWINGS

The enclosed figures, accompanied by the following detailed description serve to improve understanding of exemplary and preferred embodiments of the present invention, wherein.

DETAILED DESCRIPTION OF THE PREFERRED EMBODIMENT

Figure 1:
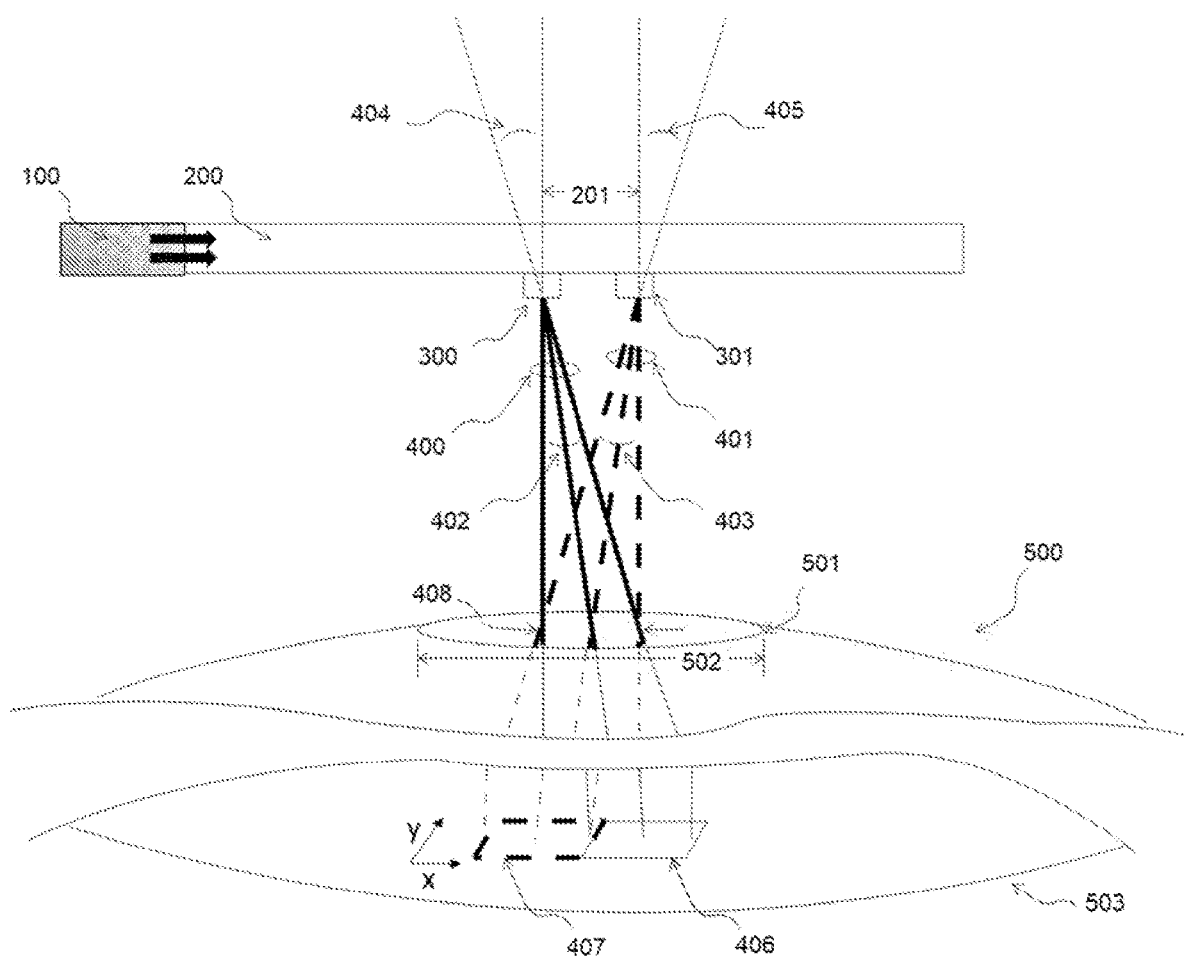
FIG. 1 is a simplified cross section view depicting the spatial and functional relationship of the human eye and the near eye display device with a plurality of discrete beam steering elements capable of projecting a composite image onto the retina that covers a portion of the user's FOV.

A system providing a near-eye display for augmented and virtual reality imaging is described. Referring to the figures, wherein like numerals indicate like or corresponding parts throughout the several views, a near eye display lens 200 is supplied with image forming information transmitted from an image signal generating element 100 attached to the edge of the display lens. The lens is generally placed in front of an exemplary human eye 500 as shown in cross-sectional view of FIG. 1. For simplicity, the middle section of the eye has been removed, but it is understood that light rays transmitted through the eye pupil 501, also pass through and are optically redirected by the lens of the eye. The image signal is comprised on precise temporal (i.e. light intensity pulsing) and spatial (i.e. light directional scanning) modulation necessary for light transmitted through the lens from a collimated light emitting element (not shown) to form an image on the eye retina 503. The collimated light source may be remotely generated and injected through the edge of the display lens and emitted at a designated point or it may be generated locally at a designated point. Thus, in the preferred embodiment, the display lens 200 serves as the light emitting layer. The designated point of light emission from the lens is designed to correspond to a light beam steering element. The display device generally comprises a plurality of arrayed light beam steering elements 300 and 301, which are capable of actively scanning the beam (400, 401, respectively) over a defined angle envelope (402, 403, respectively), relative to the lens surface normal in response to, or in concert with the signal supplied by the image signal generating element 100. Each light beam emission point corresponding to a designated steering element [e.g. 300 and 301] is referred to herein as a "Pinbeam".

The collimated light beam emanating from each Pinbeam is directed to a designated area of the common display exit pupil 408, which by design corresponds to the minimum eye pupil diameter of a user. In bright settings, the human eye typically constricts to a diameter of 2 mm, which is a typical target exit pupil constraint for the present invention. The beam emanating from a Pinbeam will pass through the cornea and if at the proper incident angle, enter the pupil and then pass through the eye lens, which will further diffract the beam over a certain angle and for a normally functioning eye, will ultimately focus the light of the beam onto a small spot on the retina. This spot forms a retinal image pixel. By scanning the light beam in a pattern within the exit pupil area, such as a raster scan pattern 410 at a refresh rate above that required for video image persistence of vision (generally 24 Hz minimum, and ideally 60-90 Hz), and modulating the intensity of the light beam per the image signal for each frame, an image frame 406 will be formed on the retina of the eye and perceived by the brain. In the example of FIG. 1, the two Pinbeams form a composite image from two adjacent image tiles 406 and 407. The composite image is perceived by the brain to be a single seamless image.

In the present invention each Pinbeam is responsible for overlaying virtual information covering a designated portion of the user's natural 2-dimensional (i.e. lateral and vertical) FOV, 404 and 405, which is mapped to a 2D image 406 and 407, respectively, on the retina 503. When accommodation imaging is employed as discussed herein, the FOV coverage is a 3-dimensional (i.e. lateral, vertical, and depth) envelope. In the preferred embodiment, the image is farmed using a square raster scan pattern having extents that fill a design exit pupil 408 that is smaller than the design eye pupil 501 of a user's eye, 500. As a result, the FOV coverage takes the form of a rectangular pyramid solid angle. Alternatively, circular spiral, hexagonal, or other scan pattern shapes could also be employed, which would have correspondingly different FOV coverage regions. For simplicity, only square raster scan patterns are discussed herein.

In FIG. 1, it might appear that the interspacing between Pinbeams 201 may leave a gap in the FOV, coverage. However, adjacent Pinbeams 300 and 301 can emit collimated beams of light into the pupil at a relative angle of 0. Because it is the angle of incident light relative to the eye pupil orientation that determines the resulting imaged point on the retina 503, these exemplary Pinbeams demonstrate that both are capable of emulating the same flat wavefront emanating from a point source directly in front of the display wearer. The resultant overlap occurs at the interface between image tiles 407 and 406. However, an exemplary design feature is the maximum Pinbeam interspacing 201 which must be less than the minimum design pupil diameter 502 for the human eye pupil 501 to avoid gaps in the composite retinal image. In general, the minimum constricted diameter of the human pupil is 2 mm, which occurs when the eye is subjected to bright daylight. As a result, 2 mm is a typical minimum design eye pupil diameter 502, although other pupil diameters may be used.

Figure 2A:
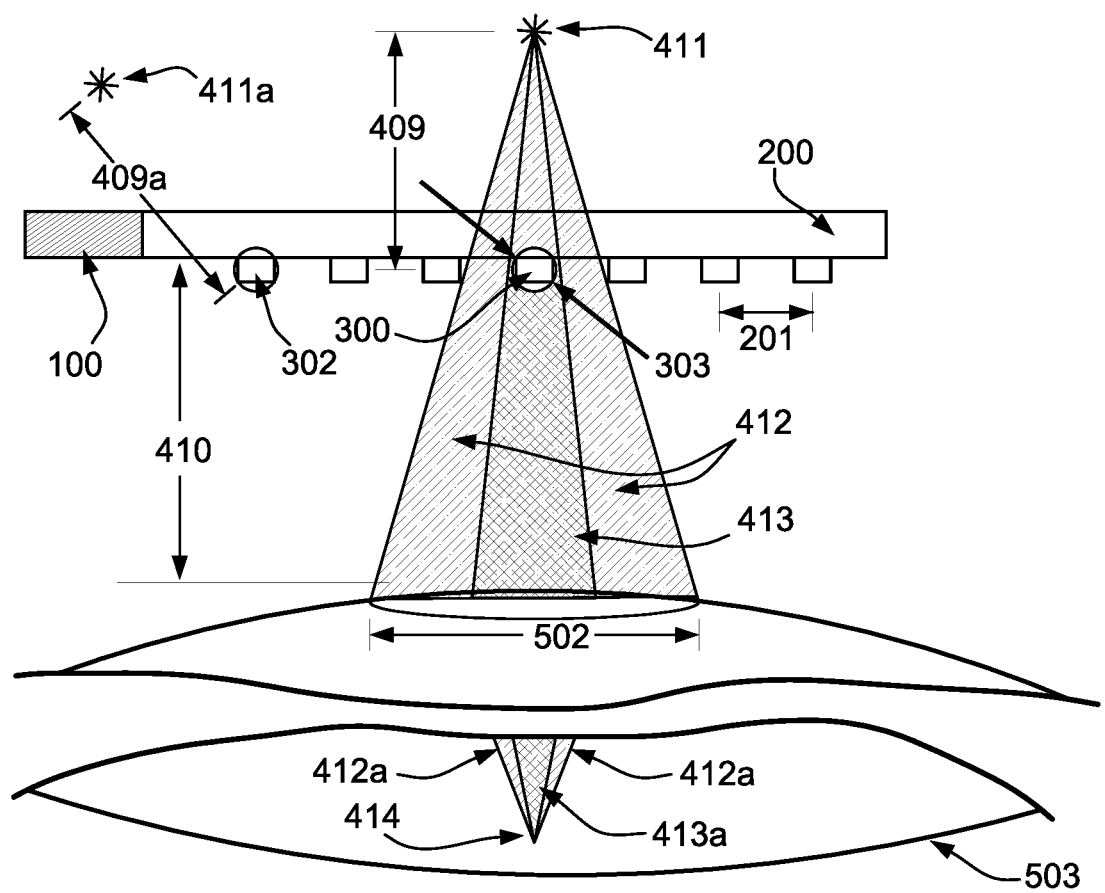
FIG. 2A shows a cross section view of the display and eye depicting the design parameters that need to be considered when optimizing the transmissive properties of the display.

Another exemplary design feature is the maximum Pinbeam active area. FIG. 2a depicts the method for optimizing the maximum size of the Pinbeam active area. The Pinbeam array has a typical spacing 201 determined as described herein, and an eye relief 410 between the lens surface and the closest point on the eye (i.e. the apex of the cornea, which is nominally offset mm from the eye pupil plane). The preferred embodiment employs an eye relief of 12 mm, which is typical for standard eyewear, but may be other values for different eyewear form factors such as goggles or visors.

The active area of the Pinbeams on the array may comprise materials that obstruct the path of ambient light by fully occluding, attenuating or otherwise modifying the path of transmitted light. Materials may be any combination of absorptive, diffractive, refractive, reflective elements. This obstructive active area must be surrounded by transparent substrate 200 that does not obstruct ambient light. By design, the size of the active area components 303, as well as all other similar Pinbeams on the array, should be as large as possible to simplify display fabrication, but small enough relative to the design eye pupil diameter 502 such that optical aberrations introduced by the presence of active area components in the FOV are too small to be noticeable by the eye and brain.

Due to eye rotation, Pinbeams are rarely squarely in line with the eye pupil, such as exemplary Pinbeam 302. It is therefore the projected 3-dimensional area of the Pinbeam components 303 that is of interest and must be bounded. For simplicity, the 3-dimensional boundary 303 is depicted as a 2-dimensional circle, but the boundary envelope should be thought of as a sphere having at least two points of its interior surface in contact with the active area 300 components. In some embodiments, the Pinbeam active area may comprise moving parts, such as a high-speed vibrating lens array. In these embodiments, the boundary envelope must account for the range of motion of active area components. At no point in the range of motion should a Pinbeam component exceed the defined boundary envelope.

The Pinbeam active area must be less than the design pupil area minus some margin; otherwise complete blockage of a portion of ambient light emanating from objects within the scene in the user's natural FOV will occur and an observable screen-door effect will be observed. The process for determining this margin is disclosed herein.

As depicted in FIG. 2a, if the projected Pinbeam active area 303 is smaller than the design pupil diameter 502, light emanating from a real object point source in the scene, 411, will be partially blocked creating a shadow 413 while the remaining light 412 will pass through the transparent portion of the substrate 200 to enter the pupil, forming image 414 on the retina, 503. In other words, the Pinbeam having a projected area smaller than the eye pupil area is effectively invisible to the eye, apart from optical aberrations.

A smaller the Pinbeam active area permits more light from point sources in the scene to transmit into the eye, generating a retinal image of relatively higher intensity compared to larger active areas. Pinbeam active areas that are too large will permit only a small portion of ambient light transmission emanating from point sources directly in the line of sight (e.g. behind) the active area components creating a low intensity retinal point image, whereas light from point sources not directly in the Pinbeam line of sight will transmit more light into the pupil forming a higher intensity point image. If the resultant intensity difference is too great between two images, over the entire array, the variation can be perceived by the user due to the eye's contrast sensitivity.

The Contrast Threshold represents the value at which contrast changes in an image are no longer perceptible. Thus, the Pinbeam active area must be small enough such that the resultant image does not exceed the contrast threshold of the eye. Contrast Threshold varies by person, however, empirical vision test data from large samples of users have been conducted to determine typical Contrast Threshold values that may be applied universally to display systems.

The primary factor affecting contrast sensitivity is spatial frequency of the high and low intensity regions of the observed scene (typically measured in Cycles Per Degree, CPD). A secondary factor is temporal frequency for dynamic images. If the scene is static and the user's head is stationary, then only spatial frequency need be considered. However, scenes are generally not static, and a user's head will move, so temporal frequencies must also be considered. Additionally, from a contrast sensitivity perspective, the worst case would be a scene of uniform color, luminance, and depth. Since ambient scenes tend to have considerable variety in terms of color, light intensity, and depth, a Pinbeam size design based on a uniform scene is conservative. Additionally, with respect to temporal contrast sensitivity, images of objects closer to the user's eye will appear to move faster than objects at greater scene depth. Because the eye can focus objects as close as 67 mm, 409, this distance used to bound the temporal sensitivity parameter. Combined with leisure head motion of approximately 100 degrees per second, this yields a relatively high grating travel motion of 1.17 meters per second.

Figure 2B:
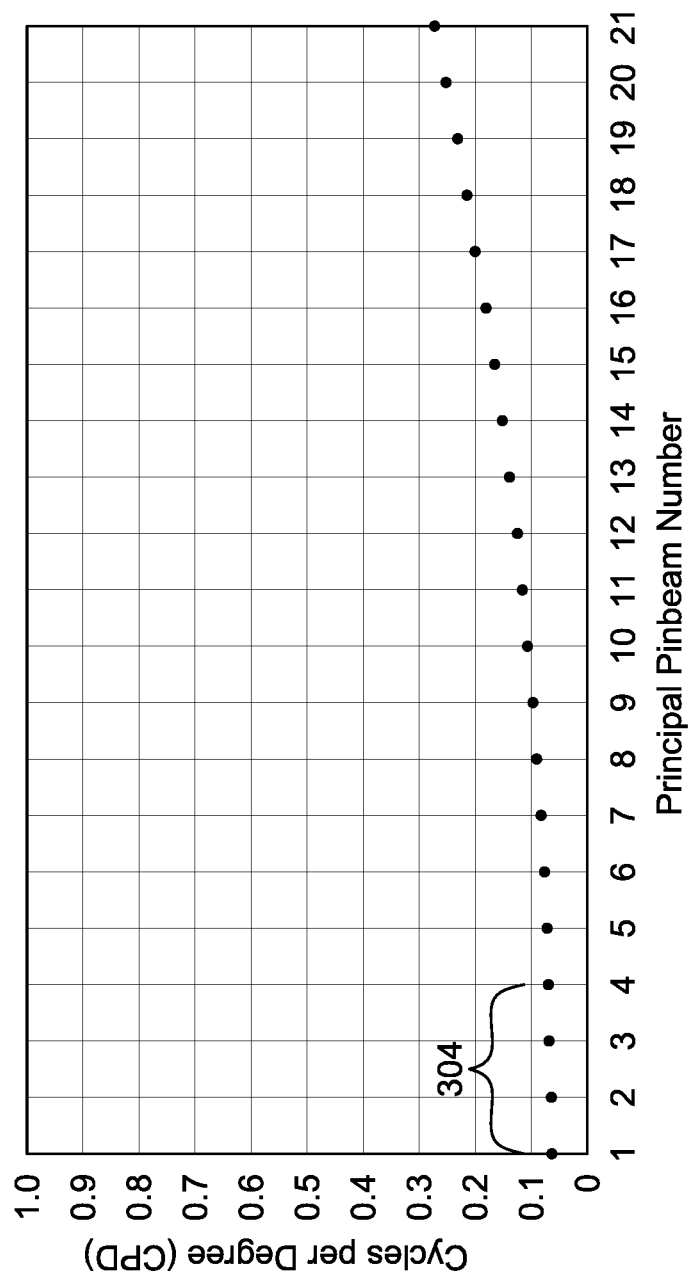
FIG. 2B is a plot of the spatial frequency of the non-transparent elements patterned on the display lens from the perspective of the eye pupil at rest.

FIG. 2b depicts the spatial frequency of the preferred embodiment from the perspective of the eye pupil gazing directly forward in line with the central, principal Pinbeam on the display surface (FIG. 2a, 300). Because the lens is flat the spatial frequency of the Pinbeam array pattern with respect to the eye pupil is lowest at the lens design center and increases towards the lens edge. Curving the lens can yield more uniform spatial frequency. Because contrast sensitivity drops significantly outside of the foveal region, factoring in eye rotation, only the Pinbeams in the range of +/−20 degrees in the vertical and horizontal FOV, 304, need be considered, which corresponds to Principal Pinbeam numbers 1 through 4. It is noted that other Pinbeam patterns and spacing are possible, and therefore the resulting spatial frequency may vary.

In a paper entitled "Motion and vision. II. Stabilized spatio-temporal threshold surface," by D. H. Kelly, in J. Opt. Soc. Am. 69, 1340-1349 (1979), Kelly derived a 3-dimensional spatiotemporal Contrast Sensitivity Function (CSF) map based on empirical data that combines the empirical data for both spatial and temporal contrast sensitivity thresholds. Based on this map it is known that the peak contrast threshold (~0.0017) occurs at spatial frequencies of 3-4 CPD, and temporal frequencies of 8-10 Hz. At lower spatial frequencies of the preferred embodiment (i.e. approximately 0.1 CPD), the contrast threshold drops to about 0.09. Natural head movements will result in temporal patter flux that is near zero or well above the peak 8-10 Hz. Above and beyond this peak, the threshold contrast drops off significantly and can therefore be ignored for the purposes of designing a Pinbeam array for practical use.

Michaelson Contrast, c, is defined as $(I_{max}*I_{min})/(I_{max}+I_{min})$, where I is intensity. If $I_{max}=1$, then $I_{min}$ is given by the following equation:

$$I_{min}=(1-c)/(1+c)$$

Given a threshold contrast of 0.09, the lower luminance ($I_{min}$) is 0.835. This means that to prevent the eye from noticing intensity variances of ambient light from a scene, light from point sources in the path of a Pinbeam must be at least 83.5% as bright as light from unattenuated point sources. Thus, the maximum projected area, A_p, of a Pinbeam is given by the following equation:

$$A_p=(1-1_{min})*A_{dp}$$

Where $A_{dp}$ is the design pupil area. Given a design pupil diameter or 2 mm for the preferred embodiment, having an area of 3.142 mm^2, the Pinbeam active area, 303 must be no larger than 0.5184 mm^2 or a diameter of 800 microns.

At a 12 mm eye relief, or any relief closer than approximately 67 mm, Pinbeams are too close to the eye to be detected and thus are considered "unfocusable". Ambient light reflecting off Pinbeam active area components and entering the pupil will be highly divergent, far exceeding the focusing capabilities of the eye's optics. This low intensity light will be broadly distributed across the retina and will go unnoticed by the eye and brain compared to focused light from the real and virtual retinal images.

In the preferred embodiment, because the Pinbeams scan the emitted light beams in a rectangular raster scan pattern, the beam scan patterns from all Pinbeams entering the eye pupil form a square exit pupil 408, but other patters may yield different exit pupil shapes. To maximize the FOV coverage of each Pinbeam, the maximum side length of a square exit pupil is easily determined so as not to exceed the minimum design eye pupil diameter 502 using Pythagorean Theorem. For a 2 mm design eye pupil, the maximum exit pupil length is 1.414 mm.

Given that the minimum pupil diameter, 501*d*, establishes an upper bound on the Pinbeam spacing, and the device configuration designer may find it desirable to reduce the number of Pinbeams utilized, methods may be employed to actively manage the human eye pupil dilation to ensure a larger pupil diameter. In one preferred embodiment, a secondary permanently tinted or variable tint lens may be affixed, preferably to the outer surface (i.e. away from the eye) of the first lens 200, such that the intensity of ambient light incident upon the eye is regulated providing some degree of indirect control over the dilation of the eye pupil. Chromogenic materials such as photochromic, electrochromic, or thermochromic materials, as well as variable light transmitting systems such as electrically controlled polymer dispersed liquid crystal, micro-blind, or suspended particle (i.e. "smart glass"), which may be controlled using feedback from an outward-facing ambient light intensity sensor (e.g. photodiode), or an inward-facing pupil imaging sensor (e.g. an infrared camera), or a combination thereof, may be used to actively regulate ambient light transmission through the lens to manage eye pupil dilation within specified limits.

Figure 3A:
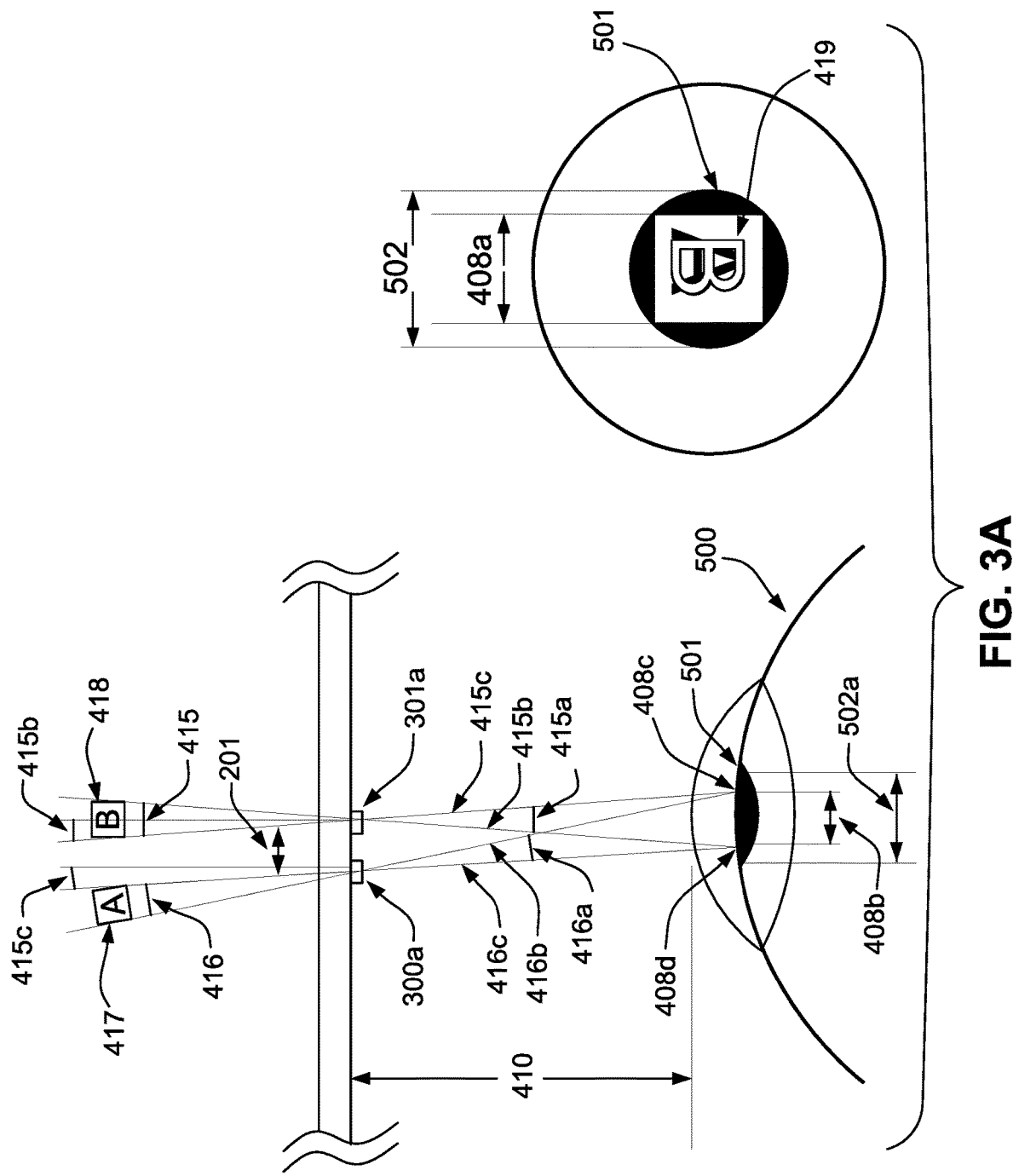
FIG. 3A shows a cross section of the display system depicting a 2-dimensional array of Pinbeam elements spaced and oriented on the display lens based on design criteria associated with the relative geometry of the human eye.

FIG. 3*a* depicts the typical design method for determining Pinbeam location and angular FOV coverage responsibility. First, a display lens eye relief 410 is determined, which as discussed previously is 12 mm for the preferred embodiment, although other distances are possible depending on the desired device form factor. Second, a design exit pupil 408 width is determined based on the design eye pupil 502 diameter, at 1.414 mm and 2 mm, respectively, for the preferred embodiment. Third, a first Pinbeam 300 location is selected, from which the locations of all remaining Pinbeams will be determined.

The lens 200 is predominantly flat, and given that the eye can rotate relative to the lens upon which the Pinbeams are affixed, there is a point on the lens surface that will always be in closest proximity to the surface of the eye. If a uniform Pinbeam spacing on the lens surface [e.g. a 1.414 mm square grid] is employed, then the Pinbeam or Pinbeams in closest proximity to the eye surface (i.e. the geodesic point), 301*a*, will inherently have the largest angular FOV coverage responsibility. In general, this is referred to the "principal Pinbeam" the entire display.

The fourth step in Pinbeam location determination depends on the ray traces of the collimated light beam emanating from each Pinbeam at the extremes of the Pinbeam scan range. Referring to FIG. 3*a*, a first Pinbeam location on the lens 301*a* is established as described previously. The rays emanating from the Pinbeam 415*b* and 415*c* represent the lateral angular limits of the steered collimated beam of that Pinbeam's scan range 415*a*. As discussed previously, at the eye pupil 501. these rays intersect at the lateral exit pupil extents 408*c* and 408*d*. Thus, the image that is projected onto the retina may occupy any space in the Pinbeam angular range 415, as defined relative to the surface normal axis 415*b*. Note that the cornea depicted in FIG. 3*a* over the eye pupil 501 has refractive power that tend to direct light into the pupil and toward the eye lens (not shown). Because this lensing has a positive effect of yielding a smaller effective design exit pupil width 408*b*, the effects are ignored in the Pinbeam display design. However, the designer may take advantage of this additional lensing to allow greater Pinbeam spacing.

Figure 3B:
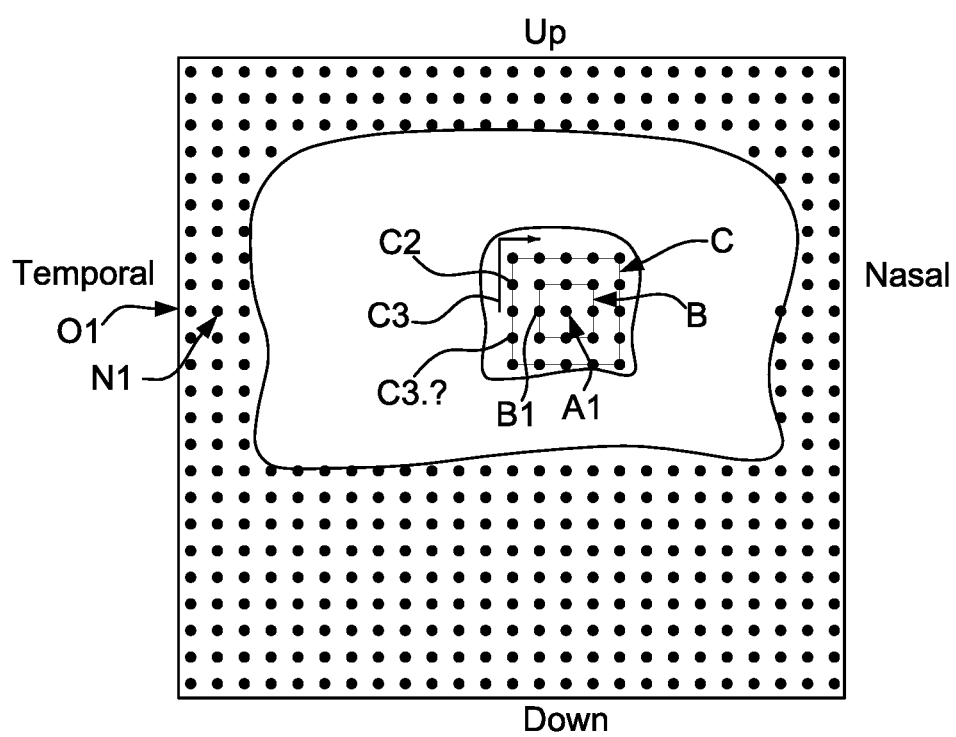
FIG. 3B shows the Pinbeam array lens layout and labeling convention.

The lateral position of a second Pinbeam 300*a* is determined relative to an arbitrary first Pinbeam position 301*a* (typically the geodesic point) by laterally translating the larger ray angle of the first Pinbeam 415*c* horizontally along the surface of the lens, a distance 408*a* that is equal to the lateral exit pupil width. The newly formed ray trace 416*c* terminates at the opposite exit pupil extent 408*d*. The point at which the new ray 416*c* intersects the display lens surface to determine the relative lateral center point position of the second Pinbeam 300*a*. This method ensures that the outermost ray of the first Pinbeam and the inner-most ray of the second (i.e. adjacent) Pinbeam have the same angle relative to the surface normal 415*b* and 415*c*, and ensures there is no gap in user FOV coverage with respect to the composite image formed from two adjacent image tiles 417 and 418 projected onto the retina. The same method is extended laterally and vertically to the extents of the lens substrate to determine all Pinbeam locations over the lens surface as depicted in FIG. 3*b*. The result is a uniform rectangular matrix of Pinbeams with a distance between centers equal to the width 408*a* of the design exit pupil 419 and is independent of the lens eye relief distance 410.

Figure 3C:
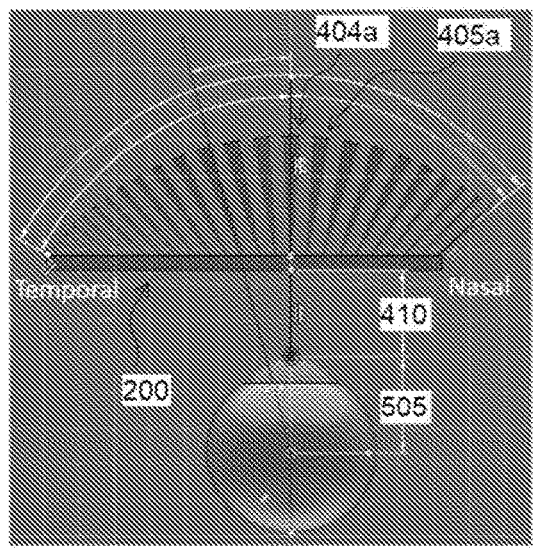
FIG. 3C shows the combined lateral and vertical field of view of a display lens.
Figure 3C:
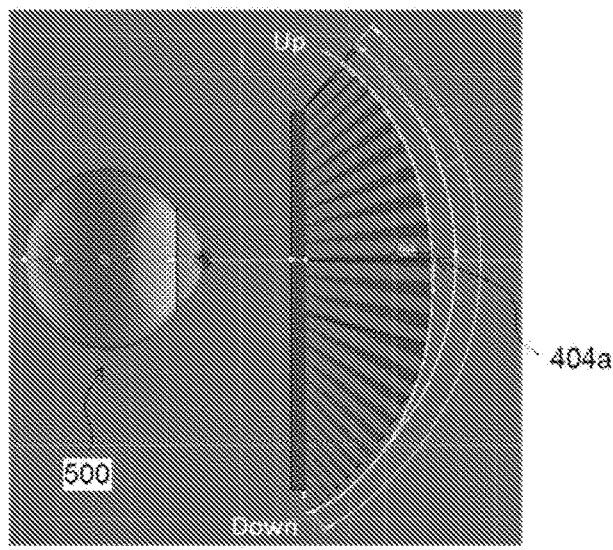

The extents of the lateral angular FOV coverage responsibility 416*a* of the second Pinbeam 300*a* may be determined by tracing a ray 416*b* between the center of the Pinbeam position and the inner-most lateral extent of the exit pupil 408*c*. Thus, the angular distance between ray projections 416*b* and 416*c* defines the lateral angular FOV coverage 416*a* of this second Pinbeam. The same method is extended laterally and vertically (not shown) to the extents of the lens substrate to determine the angular FOV coverage for all Pinbeams on the lens. The composite angular FOV coverage of the display is determined as depicted in FIG. 3*c*, by summing the FOV coverage angles, for example 404*a* and 405*a*, of each Pinbeam along the lateral and vertical axis of display lens 200. For clarification, Pinbeam FOV coverage envelopes for exemplary individual Pinbeams 404*a* and 405*a* are labeled.

For reference purposes, the Pinbeam naming convention depicted in FIG. 3*b* is assumed. FIG. 3*b* depicts an exemplary layout of a 24 by 24 Pinbeam array, designed for the left eye and is viewed from the perspective of the user (i.e. looking out through the lens). Pinbeam "A1" is the central Pinbeam and is designed to be located directly in front of the user's eye pupil at the natural at-rest forward gaze angle. The remaining Pinbeams are referenced from his central Pinbeam. Starting with A1 and moving toward the temporal side of the lens, the Pinbeams lettered in increasing value (i.e. B1 through O1) are referred to as "Principal Pinbeams," Beginning with each Principal Pinbeam, a square can be traced about the central Pinbeam A1, creating a Principal Pinbeam square.

By convention, these squares are referred to as Pinbeam Square taking the lettered name of the Principal Pinbeam from which it originates. For example, Pinbeam Squares B and C originate from Principal Pinbeams B1 and C1, respectively. The Pinbeams coincident along the same square all share the same FOV coverage angle envelopes and hence, resolution requirements. By convention, individual Pinbeams are coincident along a square adopt the letter of the Principal Pinbeam and are numbered in increasing value starting with the Principal Pinbeam value "1" and moving clockwise (or counter-clockwise for the right display lens). For asymmetric Pinbeam lenses in which squares are truncated by the lens edge, the missing Pinbeam numbers are simply skipped.

Figure 3D:
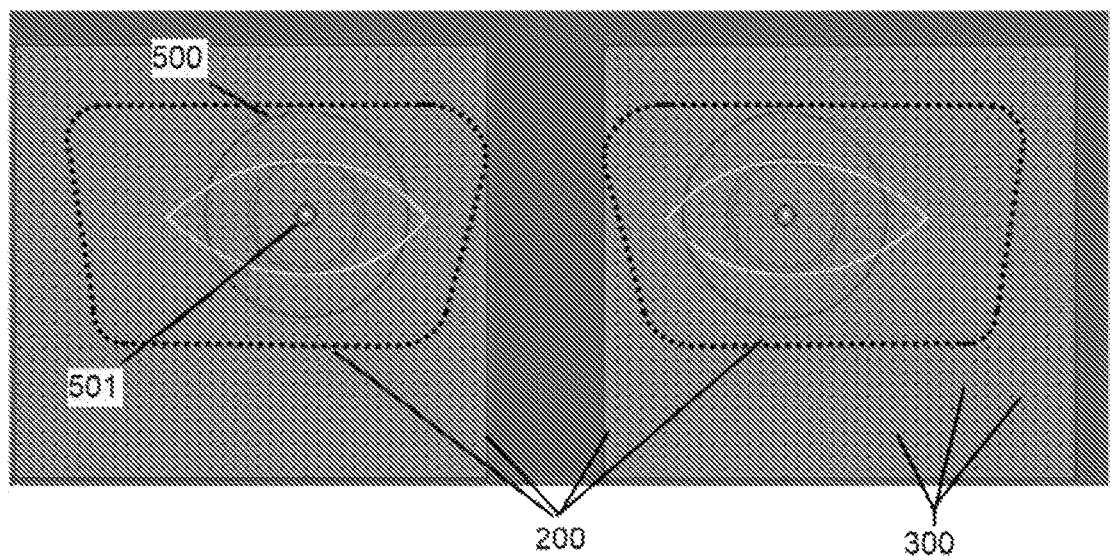
FIG. 3D shows the process of trimming a display lens to fit standard eyewear frames.

Independently, each eye can see ~170° horizontally & 140° vertically (i.e. monocular FOV), limited on the inside, top and bottom by facial features (i.e. the nose, brow, and cheeks, respectively). The overlapped region of the scene that both eyes can see concurrently, referred to as "binocular overlap," extends nominally 140° horizontally and 140° vertically (stereoscopic FOV) relative to the center point between the eyes (i.e. ½ the interpupillary distance). In this region, depth information in a scene is obtained via both stereoscopic (i.e. vergence) and accommodation feedback mechanisms. The composite FOV range of both eyes relative to the interpupillary center point, considering both monocular ranges and binocular overlap, extend 200° horizontally and 140° vertically (binocular EONS).

Where a glasses form factor with two lenses is employed, for a single display lens, it is desirable to target a display design FOV that matches the maximum monocular FOV extents. While the present invention can encompass the entire monocular FOV extents of each eye, user comfort and aesthetics of the wearable display must also be considered. As a result, as depicted in FIG. 3d, the display lens 200 may be trimmed to a size and shape of typical eye glasses frames (dotted outline). Once trimmed, the total Pinbeam count is reduced and correspondingly, the user's FOV becomes limited by the frames of the glasses rather than their own facial features.

Figure 4:
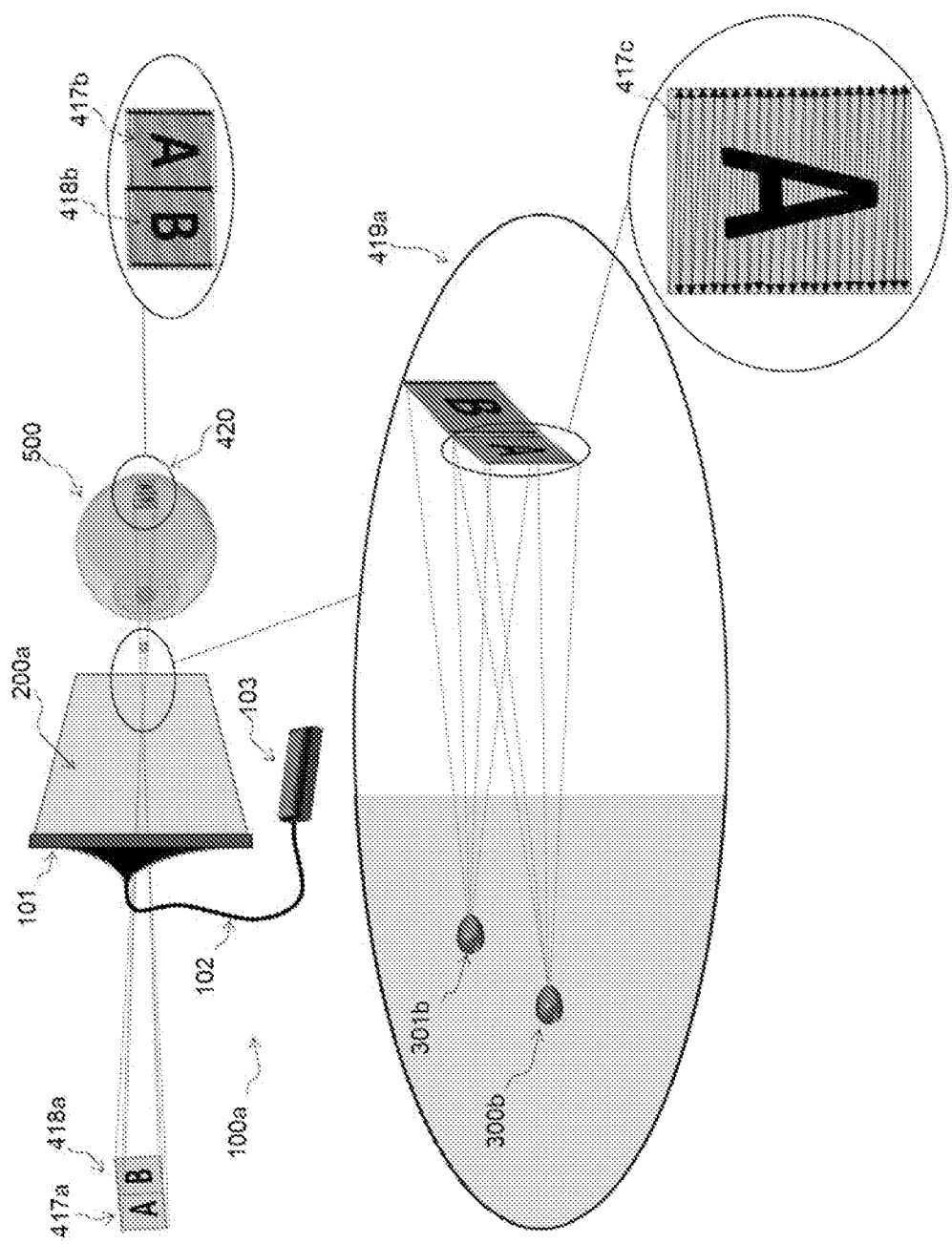
FIG. 4 is an isometric view of the display system projecting two raster scanned image tiles from two respective Pinbeams into the eye to form a composite retinal image.

While the preferred embodiment of the present invention uses an exemplary flat lens occupying the lens area of a typical pair of eyeglasses frames, it is evident that the present invention may also by applied to form factors that use curved lens surfaces, multiple surfaces or continuous surfaces that extend beyond the limits typically associated with eyeglasses frames, as well as the application of Pinbeams to opaque surfaces, such as the frame around the transparent lens or the temple of the frames to extend the FONT beyond the transparent lens portion of the eyewear FIG. 4 depicts the composite image projected onto the retina (420) comprising retinal image tiles (417b, 418b) generated by the raster scanned light beams of two exemplary. Pinbeams 300b and 301b, emulating wavefronts from intended virtual images 417a and 418a. Each image tile is formed by time-synchronizing the modulation of the light beam intensity with the x- and y-axis scan rates (i.e. image flame rate). As an example, it may be assumed that a composite square virtual image 417c is to be generated at a frame rate of 60 Hz by at a resolution matching the maximum general resolving capability of the eye (62 PPD), and a determined 6.72 degree horizontal and vertical angular FOV responsibility for each Pinbeam (i.e, 0.0137 sr). In this example, the resultant raster scan pattern of each Pinbeam must comprise 416 rows (not shown), and the light beam emanating from the Pinbeam must be capable of being modulated at a rate of about 416 times per scanned row for a total of 173,056 pixels per frame. At a 60 Hz frame rate, each Pinbeam requires a beam steering x-axis (horizontal) scan rate of 24,960 Hz (24.96 kHz) and a y-axis (vertical) scan rate of 60 Hz. Each light beam must be modulated at a rate no less than 10,383,36 Hz (i.e. ~10.4 MHz).

Suitable embodiments of the present invention may be constructed which yield a resolution well below the human threshold capability, for example between 9 and 35 PPD, which decreases the data rate required to be generated and transmitted to the lens by the image generating element 100a, which in this depiction comprises an image computing element 103, a transmission media 102, and a lens coupling element 101. An image computing element 103 may be any device storing, manipulating, and transmitting image data to the lens display 200, such as a local or remote computer, portable electronic device, Field Programmable Gate Array (FPGA), Application Specific Integrated Circuit (ASIC) or similar. The transmission media 102 may be any media capable of transmitting data signal from the image computing element to the display lens 200, such as a High Definition Multimedia interface (HDMI) cable, Fiber Optic cable, an Optical Fiber Bundle, or a wireless transmission facility such as infrared, radio, or Wireless Fidelity (Wi-Fi).

That the image generating element 100a has the responsibility of understanding the position, orientation, and depth of virtual image tiles 417a and 418a intended to be perceived by the eye, assigning the image tile to a designated Pinbeam, and completing a 180-degree rotational transformation of each image tile depicted in detail 419a prior to being transmitted for projection. It is common for head worn displays to use ancillary integrated data acquisition systems comprising any individual or combination of devices and subsystems such as cameras, depth sensors, inertial measurement devices, computer vision localization and mapping software, LIDAR, GPS, radio beacon, radiometers and other systems or devices to allow the image generating element to accurately determine the user's eyes, head and body position and orientation (i.e. "pose") relative to a given scene, as well as the depth, content, and illumination of real objects in a given scene in near real time. Such systems, referred to herein as "environment mapping system," are well known in the state of the art and are therefore not covered here in detail. However, it is understood that the present invention may be used in conjunction with any combination of such systems for the purposes of supplying the image generating, element with the data necessary to appropriately allocate image data to individual Pinbeams.

Figure 5:
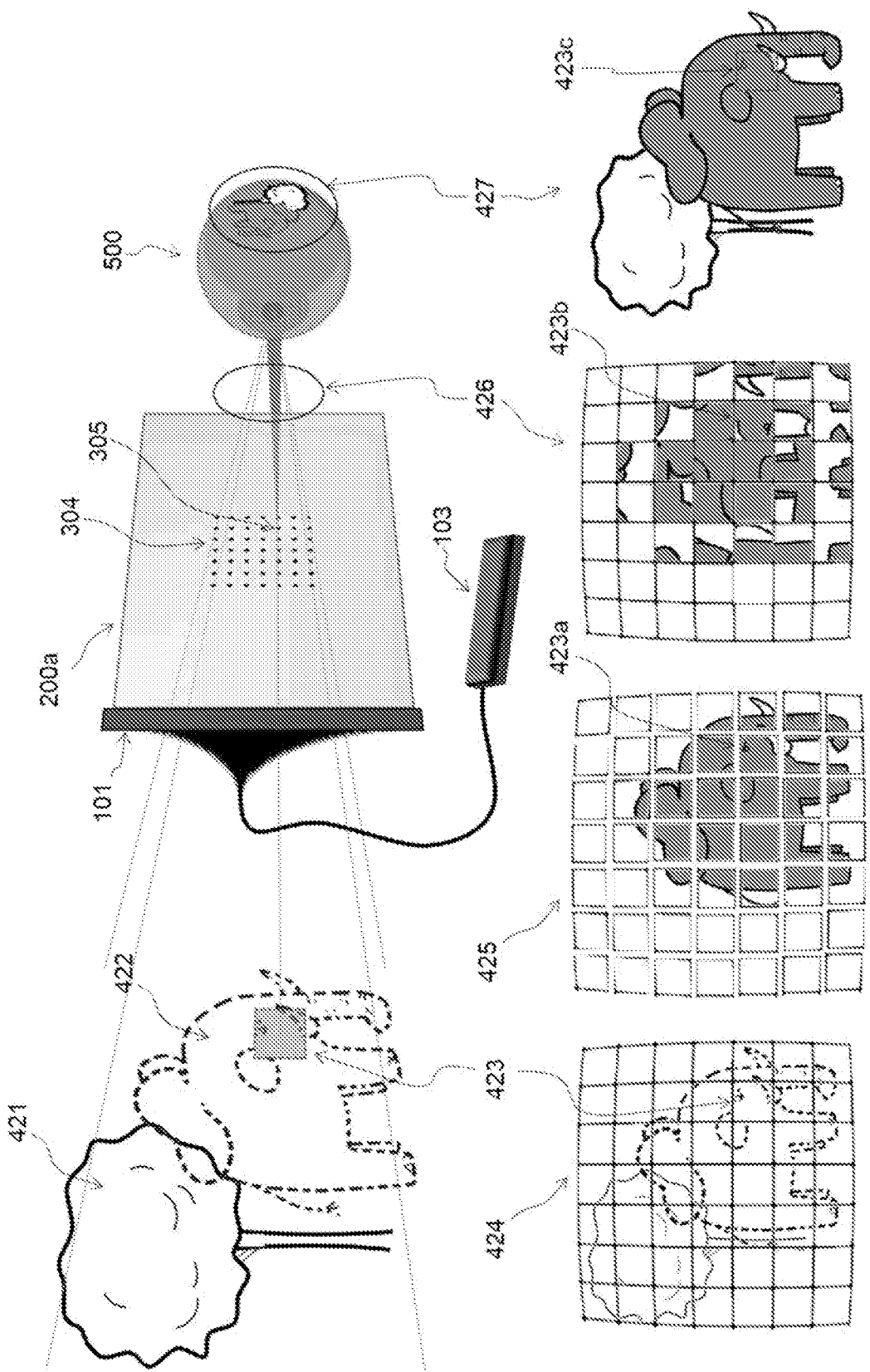
FIG. 5 depicts the augmented reality image forming process of the present invention.

FIG. 5 depicts the image forming process of the present invention. An augmented reality software (not shown) identifies a need to overlay a virtual object 422 (a winged elephant) in a user's environment containing real object 421 (a tree). For clarity, only the user's eye 500 is depicted looking at the real scene through the Pinbeam display lens 200a. The augmented reality software uses data received from environment mapping system (not shown) to understand the intended 3-dimensional. position of the virtual object in the scene 424 and thus, how the virtual image should be parsed into image tiles 425 for transmission to the appropriate Pinbeams responsible for the corresponding FOV envelopes. For stereoscopic images, a stereo pair of virtual image overlays are generated. The preceding steps can be accomplished using augmented reality scene data acquisition and analysis software common in industry. The image computing element 103 of the present invention receives the image information and parses the image into tiles by matching the location of virtual object points in the FOV of each user eye with the Pinbeams having FOV coverage angles encompassing those locations. For example, virtual image tile 423 is found to correspond to Pinbeam 305. Element 103 then completes a 180-degree rotational transformation on all image tiles 426. The resultant image data is then transmitted through the remaining components of the image generating element 100a to the Pinbeam lens 200a, comprising Pinbeam array 304. The Pinbeams project the allocated image tile based on the dedicated image tile data received. The projected image tiles cross over at the eye pupil and the intended composite virtual image overlaid onto the real scene, 427, image is properly mapped onto the retina.

When a natural or emulated light wavefront enters the eye through the cornea and pupil it passes through the eye lens, which serves to focus the photons to a fine point on the retina. The size of the focused point of light is governed by the Point Spread Function (PSF) and at its minimum the focused point is diffraction-limited and referred to as the Airy Circle. The precise diameter of the Airy Circle is a function of the eye pupil aperture (i.e. dilated pupil diameter) and wavelength(s) of light comprising the wavefront. However, the diffraction limited focused spot diameter for visible wavefronts imaged by the eye is approximately on the order of about 7 micrometers. In the foveal region of the retina, which is the most sensitive given the increased density of photoreceptors, the Airy Circle encompasses about 10 cone cell receptors.

The PSF represents an optical limit on the maximum resolution the eye naturally achieves in normal ambient lighting conditions, and thus represents an upper-bound to the objective pixel resolution of the present invention. This maximum eye resolution occurs when the eye is fully dilated (i.e. approximately 7 mm diameter) and equates to about 1 arcminute (0.016 degree), or a maximum eye resolution of approximately about 62 pixels per degree (PPD), it is noted, however, that because the foveal cones are smaller than the formed Airy Circle, interference effects can allow the eye to perceive even finer detail (down to a reported 28 arc seconds or about 128 PPD) depending on scene pattern and motion of objects in the scene as imaged on the retina. Natural dithering or cyclic back-and-forth motion of the eye supports such enhanced resolving capabilities in the foveal region.

Figure 6A:
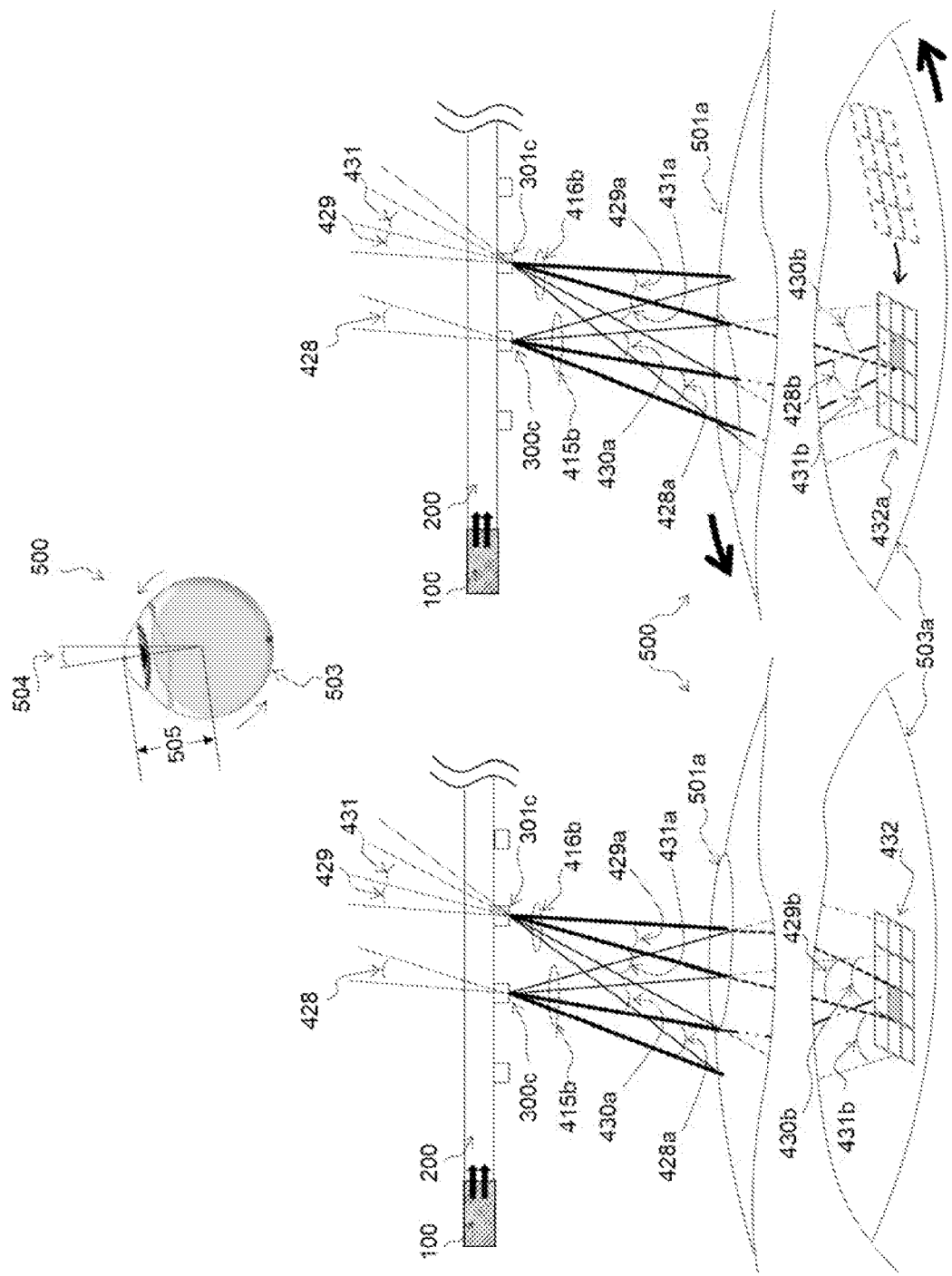
FIGS. 6A and 6B depict the use of redundant Pinbeam field of view coverage angles to expand the display exit pupil that allows the display to support eye rotation.

The natural human visual FOV can be assessed for each eye independently (monocular) and both eyes combined (binocular). When scanning a scene, while the eye can rotate thither, humans will typically rotate their eyes no more than +/−12° before turning their head to view an object of interest. As depicted in FIG. 6a, due to the freedom of the eye to rotate at an angle 504 about the center of rotation 505 (typically 13.5 mm behind the apex of the cornea), the exit pupil 408a (FIG. 3a) must be expanded to avoid vignetting of the retinal image as the eye rotates off center. Therefore, in addition to each exemplary Pinbeam (300c, 301c) primary angular FOV coverage responsibility (430a, 431a, respectively), each Pinbeam is also responsible for emitting secondary beams at angles that are redundant to at least a portion of adjacent Pinbeam's angular FOV coverage (428a, 429a).

When the eye rotates, each pixel in the retinal image 432 is maintained (432a) so long as a sufficient number of redundant beams are emitted despite the pixel's primary light beam itself being blocked by the non-transmissive portions of the eyeball outside the design eye pupil diameter. Note that this figure shows a cross-sectional side-view of the display lens 200, and that the redundancy requirement extends to all adjacent Pinbeams forming a square about the Pinbeam whose primary FOV coverage envelope is being redundantly covered. One level of adjacency means that one concentric square of adjacent Pinbeams are required to emit redundant beams, and two levels of adjacency means that two concentric squares are required and so forth. This redundancy requirement results in an increased number of pixels that each Pinbeam is responsible for illuminating, which increases the modulation speed of the light modulation signal of the image generating element 100.

Figure 6B:
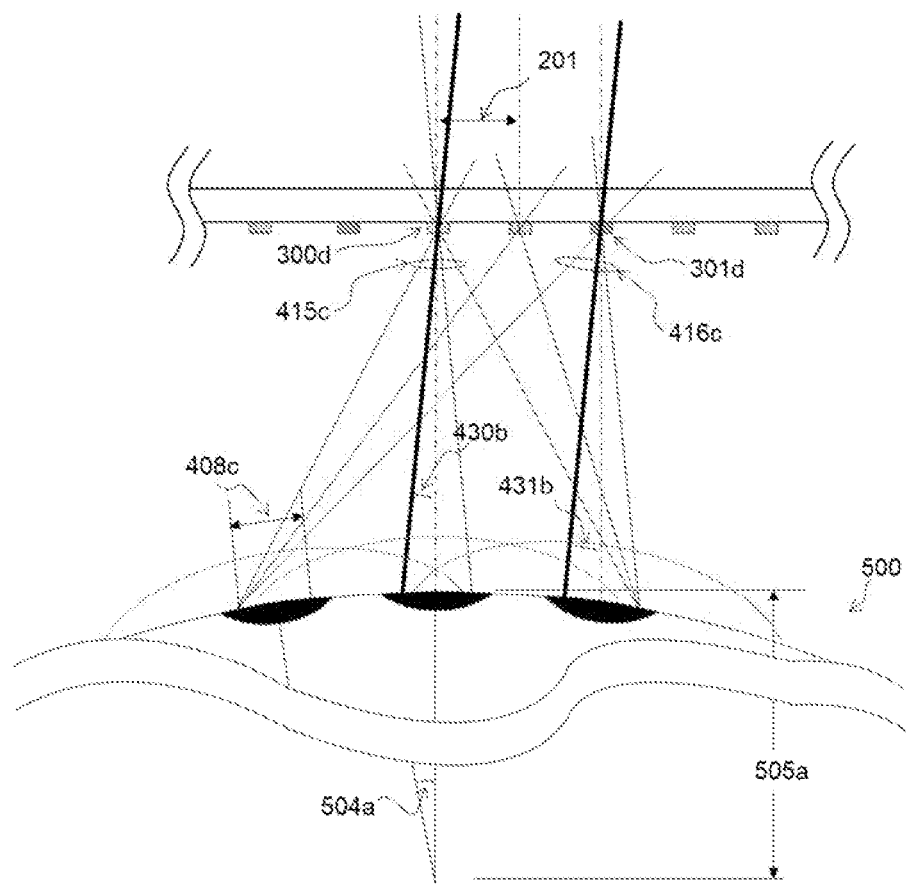

The process for defining the levels of redundancy required for each Pinbeam given a specified allowable eye rotation angle is depicted in FIG. 6b. In this diagram, the eye 500 is permitted to rotate an angle 504a about the eye center of rotation 505a. To avoid image vignetting within an eye rotation angle specified by the designer (e.g. a=12 degrees), the level of redundancy, N, for each Pinbeam is given by the following expression:

$$N = a/(2(\tan^{-1}(0.5 d/R)))$$

where d is the design exit pupil width 408c, R is the distance from the center of eye rotation to the pupil plane 505a (typically 12.5 mm), and N is rounded up to the nearest whole number. Assuming a nominal 12-degree eye rotation envelope in any radial direction off center, and using the exemplary design parameters provided, two levels of redundancy is generally sufficient. The primary FOV coverage angle 430b of Pinbeam 300d will be redundantly covered 431b by Pinbeam 301d and indeed all Pinbeams (not shown) within two interspacing's 201 from Pinbeam 300d, providing two levels (i.e. 25 Pinbeam's worth) of redundancy.

Figure 6C:
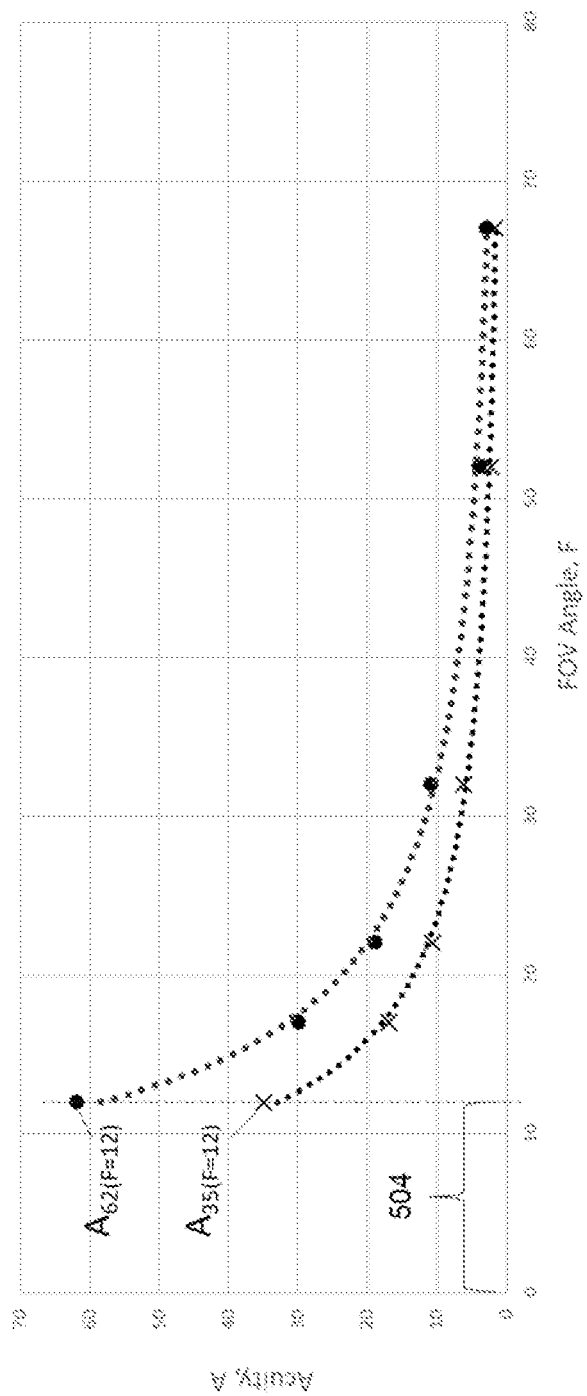
FIG. 6C depict the human eye visual acuity profile and a Pinbeam pixel count map for a device employing foveated rendering and imaging.
Figure 6C:
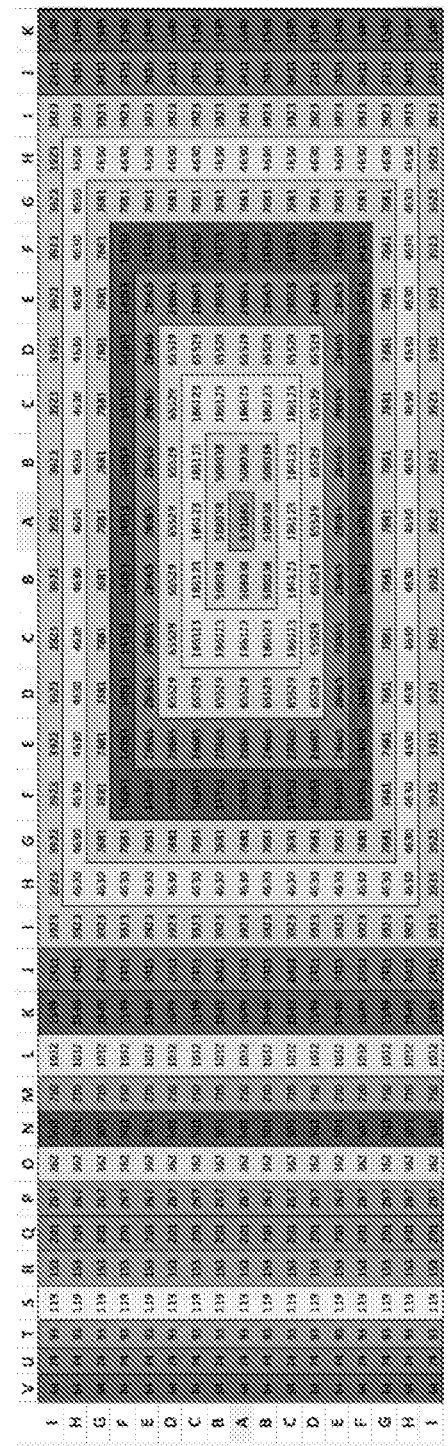

As described in FIG. 6c, foveated imaging may be employed to reduce the resolution demands of each Pinbeam and hence the entire display by taking advantage of the fact that the eye's visual acuity drops rapidly with increased pupil FOV angle. As a result, the Pinbeam(s) aligned with the center of the eye's natural gaze, as well as Pinbeams having FOV coverage angle envelopes in the range of the eye's design angle of rotation, 504, (+/−12 degrees in this exemplary plot) require the highest resolution. In contrast, Pinbeams closer to the display edge have significantly reduced resolution demands. For a display design targeting to match the limits of human visual acuity, Pinbeams in this central region would require a 62 PPD resolution. An exemplary, more cost effective design would limit the central. Pinbeam region to 35 PPD. In the to portion of the figure, the plot labeled "$A_{62(F=12)}$" provides the typical peripheral visual acuity profile for the human eye, having a maximum 62PPD resolution in the foveal portion of the FOV and accounting for the maximum design eye rotation angle, 504. This plot may be applied radially about the eye. Other acuity and eye rotation angle profiles, which may be radially asymmetric, may be employed.

The lower curve on the plot represents the scaled acuity profile for a display system having an exemplary maximum design resolution, n, of 35 PPD. The scaled profile for visual acuity, A, is given by the equation:

$$A_{n(F)} = A_{62(P)} * (A_{n(0)}/A_{62(0)})$$

where $A_{n(F)}$ visual acuity for a given resolution n, at FOV angle F, with respect to the center of gaze. Note that acuity is constant between F=0 and the maximum eye rotation angle, 504. Assuming a maximum design resolution is selected that is less than the eye's maximum resolving capability, the purpose of applying the acuity plots is to reduce the number of Pixels that must be drawn without being appreciably notice by the user (i.e. the apparent resolution across the display is constant from the user's perspective). This allows the use of light sources with slower response times and reduces the image processing and transmission demands on the image generating element of the device without impactive overall image quality, The lower exemplary plot is a Pinbeam map displaying the total number of pixels that each Pinbeam is responsible for drawings, which is a function of resolution and FOV coverage angle, Decreased resolution requirements due to foveated imaging is evident in this map of Pinbeam pixel counts, $C_{n(e)}$ for a given Pinbeam in terms of the total number of pixels that the Pinbeam must be capable of drawing, which may be found using the following, equation:

$$C_{n(e)} = (i \, A_{n(e)})^2 * E$$

where, e is the central angle of Pinbeam's FOV coverage responsibility envelope relative to the center of gaze, $A_{n(e)}$ is the acuity of the eye at angle e for a given max design resolution, n (found using the acuity profile plot described above), and E is the solid angle of the Pinbeam FOV coverage envelope. Referring to the map, tracing a line to the intersection of similar letters aids in identifying the corners of the Principal Pinbeam Squares, where the intersection of Row A and column A is the exemplary display's central Pinbeam having the highest resolution requirement assuming an maximum design resolution of 35 PPD and central Pinbeam extended FOV coverage angle of 21.61 degrees. As shown, all Pinbeams in a given Pinbeam Square share the resolution requirements.

The beam intensity and hence the perceived image pixel brightness and or hue, may be varied from zero intensity, which yields the "off state" of an image pixel appearing transparent to the user, to full intensity which yields an image pixel in the "on state" at full brightness. Additionally, intermediary intensities may also be varied to display pixel greyscale values, such that a Pinbeam simultaneously emitting red, green and blue beams, achieves increasing color depth of the retinal image. In AR applications, a large portion of displayed images is transparent, requiring only a small subset of the display's resolution capability. However, if full lens occlusion is used for fully immersive Virtual Reality applications, full display resolution will be employed continuously.

A physiological aspect of the human eye that may affect the ability of the present invention to convey a uniform virtual image to the brain is the known as the Stiles-Crawford effect. This effect describes the property of the eye in which the location at which a ray enters the pupil, as well as the wavelength of the entering light, affects the perceived intensity of the light source due to the sensitivity of photoreceptors of the eye retina to light of varying angles of incidence. With respect to a constricted pupil, the diminishing affect in only on the order of a few percent, so as not to he noticeable by the display wearer. The effect has a larger impact on fully dilated pupils (e.g. ~8 mm) under photopic conditions, thus, where the density of the Pinbeam array is based on a small design pupil diameter (e.g. spacing of ~1.414 mm), the effect is diluted by the distribution of multiple contributing beams entering the pupil at different locations. Typically, the effect is not pronounced enough to be noticed, however, such aberrations of the eye optical system can be remediated by the configuration designer by using eye-tracking systems to track the position of the eye relative to the Pinbeam array and using a feedback signal to the image generating element 100 where a pre-set scaling factor couples with the feedback signal to scale the respective Pinbeam light emission intensity accordingly. Additionally, an ambient light modulation layer being used to regulate pupil dilation may also serve to limit perception of the Stiles-Crawford effect.

Figure 7:
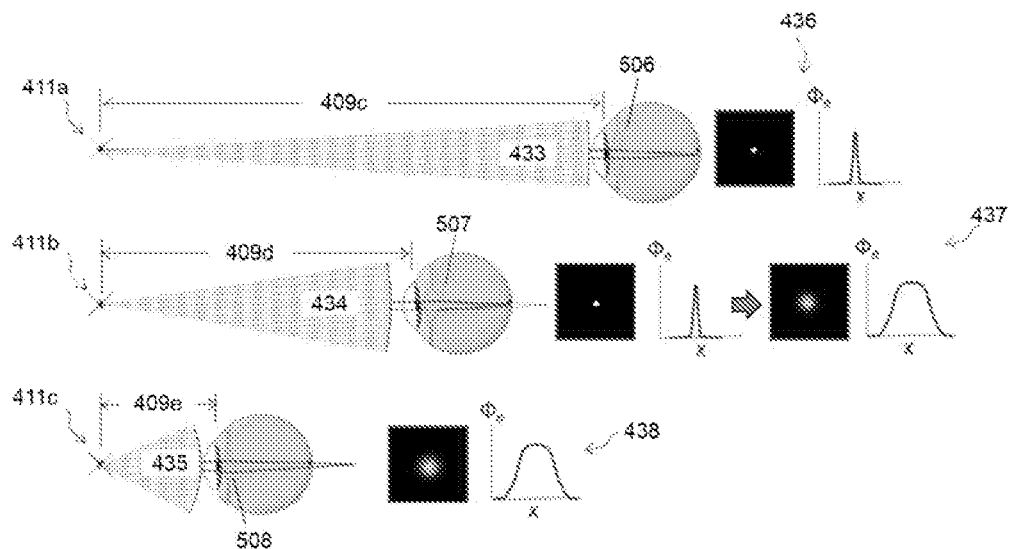
FIG. 7 depicts the shape of light wavefronts emanating from point sources at progressively smaller distances from the eye, and the resultant degree of retinal image defocus.

The ability to inject multiple independently modulable light beams into the eye at or near the same angle of incidence concurrently, as is the case with the multiple redundant Pinbeam coverage angles discussed above, allows the present invention to emulate curved wavefronts in addition to flat wavefronts. As depicted in FIG. 7, from the human eye's perspective, at an object point 411*a* distance of ~8 m 409*c* and beyond, all photons 433 comprising the emanating wavefront that enter have nearly parallel trajectories (i.e. are sufficiently collimated) by the time they reach the pupil. At this range objects are referred to as being located at optical infinity. For objects viewed in this range, the eye lens is 100% relaxed 506 with minimum curvature, and all collimated light is focused to a sharp point, or a well-defined Airy Circle, on the retina 436.

At object point distances less than approximately 8 m, 411*b* and 409*d*, wavefronts 434 start to appear divergent (i.e. uncollimated), and so the eye lens muscles must contract to curve the lens 507 to focus these diverging rays to a point on the retina (437, left). The lens can only focus wavefronts falling in a small range of incident divergence at a given time, hence in a scene with objects at a variety of depths as is typical, some objects will appear out of focus (437, right). The lens adjusts to accommodate curved wavefronts and will continuously 'hunt' back and forth between 0.25 and 0.5 diopter to ensure the optimally focused image is achieved and maintained. At object point distances closer than approximately 67 mm, 411*c* and 409*e*, the eye lens cannot curve any further 508 and so the eye alone cannot form a focused image from the highly divergent wavefronts 435 emanating from object points in this range. Instead, only an out of focus image comprising poorly defined Airy circles is formed on the retina 438.

Figure 8:
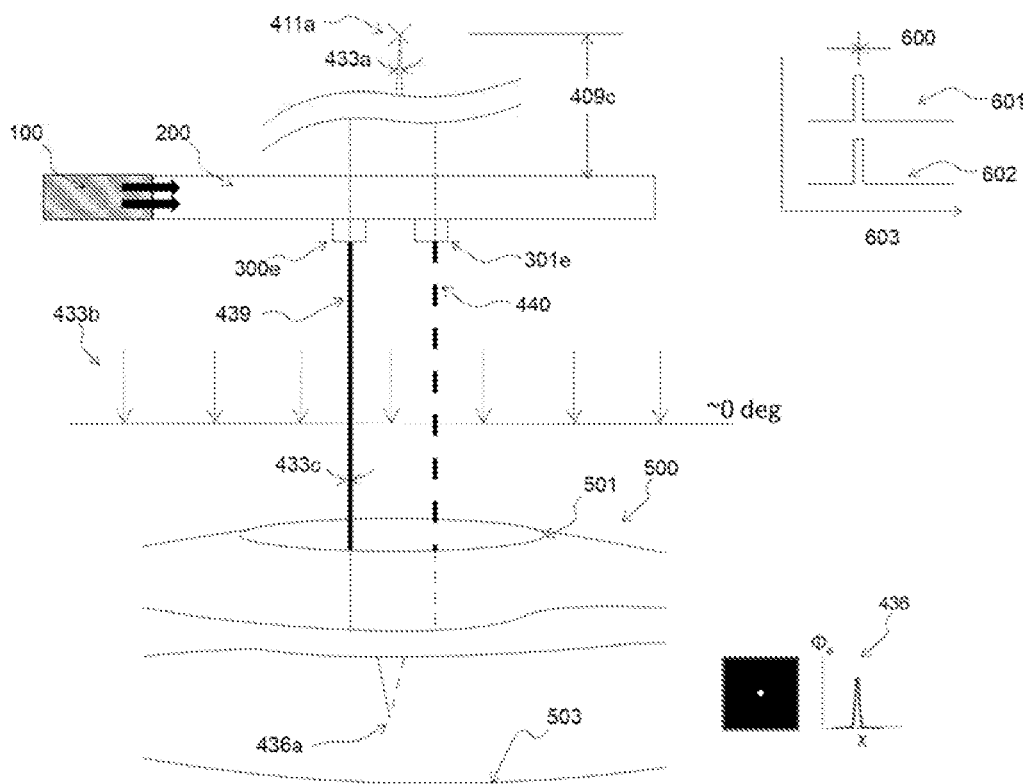
FIG. 8 shows a cross section of the display and human eye in which the display is emulating a wavefront of a point source that is at or beyond the optical infinity distance.

The present invention is capable of emulating flat wavefronts as depicted in FIG. 8. Two adjacent Pinbeams 300*e*, 301*e* emulate a flat wavefront 433*b* emanating from a virtual object point source 411*a* at a distance beyond optical infinity 409*c* by directing individual collimated light beams 439 and 440 into the eye pupil 501 at identical (redundant) angles 433*c*, which happens to be zero degrees in this example. The angle is ensured by precisely timed image data pulses 601 and 602 for each Pinbeam transmitted from the image generating element 100 that is programmed to know the precise moment with respect to time that activation of given Pinbeam will result in a desired beam emission angle. The pixel signal pulse plot depicts two pulses that are aligned with respect to their respective beam angle registers within the image generating element that store activation timing and angle correlation, 603. Thus, activation of two different Pinbeams to achieve a redundant angle may occur at different absolute times, but will be perceived by the eye to be a single image point due to the high frame refresh rate and persistence of vision effects. Assuming the eye lens is relaxed, the result is a well-focused point image on the retina 436.

Figure 9:
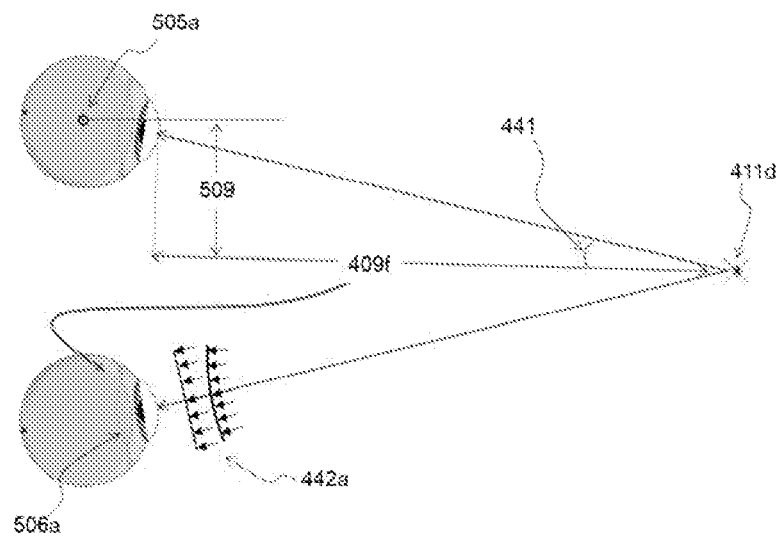
FIG. 9 provides a top view of the human binocular vision system and depicts the principles underpinning the accommodation-vergence conflict.

As depicted in FIG. 9, using binocular vision (i.e. both eyes), the brain can gauge depth 409*f* of an object 411*d* by assessing the angle 441 at which the eyes converge on an object point. This angle will be less than half the interpupillary distance 509 of the eyes, which is the distance between the center of the eye rotation 505*a* of each eye (typically 31.5 mm). This vergence angle allows objects to be viewed from two different perspectives providing stereoscopic vision capability. The eye has a natural coupling between lens accommodation and vergence movements. Specifically, when the eyes converge to a point in the distance (closer than optical infinity), the brain triangulates the point's depth 409*f* relative to the eyes and a corresponding signal is fed back to the lens muscles which in turn force the curvature of the lens as needed to focus the anticipated incident wavefront curvature 442*a* expected to be generated by a point at that derived depth.

When a close object is viewed (i.e. <8 m), the brain expects the incoming wavefront to be curved vice flat, based on stereoscopic feedback of the object depth. For stereoscopic displays that can only emit a flat wavefront, the lens muscles must override the incoming signal to curve the eye lens so that the incoming collimated light can be clearly focused on to the retina. This strain is called the vergence-accommodation conflict, and is a primary cause of motion sickness/headaches in many VR and AR display applications.

Figure 10:
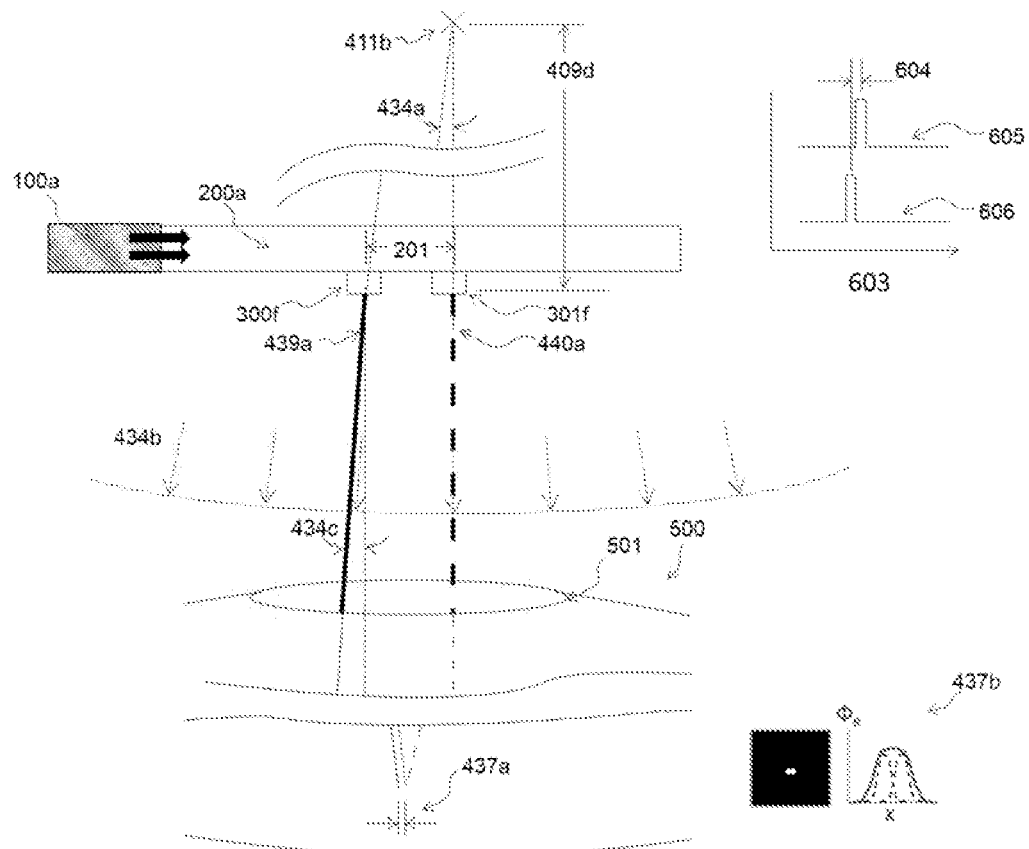
FIG. 10 shows a cross section of the display and human eye in which the display is emulating a wavefront of a point source that is closer that the optical infinity distance (i.e. a curved wavefront), but within the accommodation range of the human eye optics.

FIG. 10 depicts the process by which the present invention emulates a curved wave front emanating from a virtual object. Two adjacent Pinbeams, 300$f$ and 301$f$ emulate a curved wavefront 434$b$ emanating from a virtual object point source 411$b$ intended to be presented to a user at a distance closer than optical infinity 409$d$ by directing individual collimated light beams 439$a$ and 440$a$ into the eye pupil 501 at slightly divergent angles 434$c$. The wavefront being emulated is associated with a virtual object point 411$b$ that falls within the primary angular FOV coverage responsibility of a first Pinbeam 300$f$, which is redundantly covered by the extended (secondary) FOV coverage angle envelope of adjacent Pinbeam 301$f$. The magnitude of the divergence angle between the two beams 434$c$ is determined by projecting (triangulating) a line from each Pinbeam to the virtual object point source at distance 409$d$.

The pixel signal pulse plot depicts two pulses, 605 and 606, intentionally offset a distance 604 with respect to their respective beam angle registers programmed in the image generating element. This offset ensures that one of the redundant beams (300$f$ in this example) forms a point image at the designated angle 434$c$. The resulting image projected on the retina is that of two overlapping Airy Circles in close proximity 437$b$ form a single blurred or potentially a double image, depending on the distance 409$d$. When the eye lens is actively curved in response to an accommodation-vergence command from the brain, the two light beams will be brought into sharp focus on the retina. In this example, two redundant Pinbeams are used, however, it is apparent that any number of redundant Pinbeams may be employed concurrently to emulate a curved wavefront.

The resulting angle requires a pixel to be precisely activated using a light modulating element having a sufficiently fast response time. Additionally to ensure the display can achieve accommodation of any image, the Pinbeam spacing and design pupil diameter must be such that two or more redundant beams must be capable of entering the pupil at all times. Alternatively, multiplexed beams emanative from a single Pinbeam may be used. In yet another alternative embodiment, multiple Pinbeams occupying the same active area may be employed to facilitate accommodation.

Figure 11A:
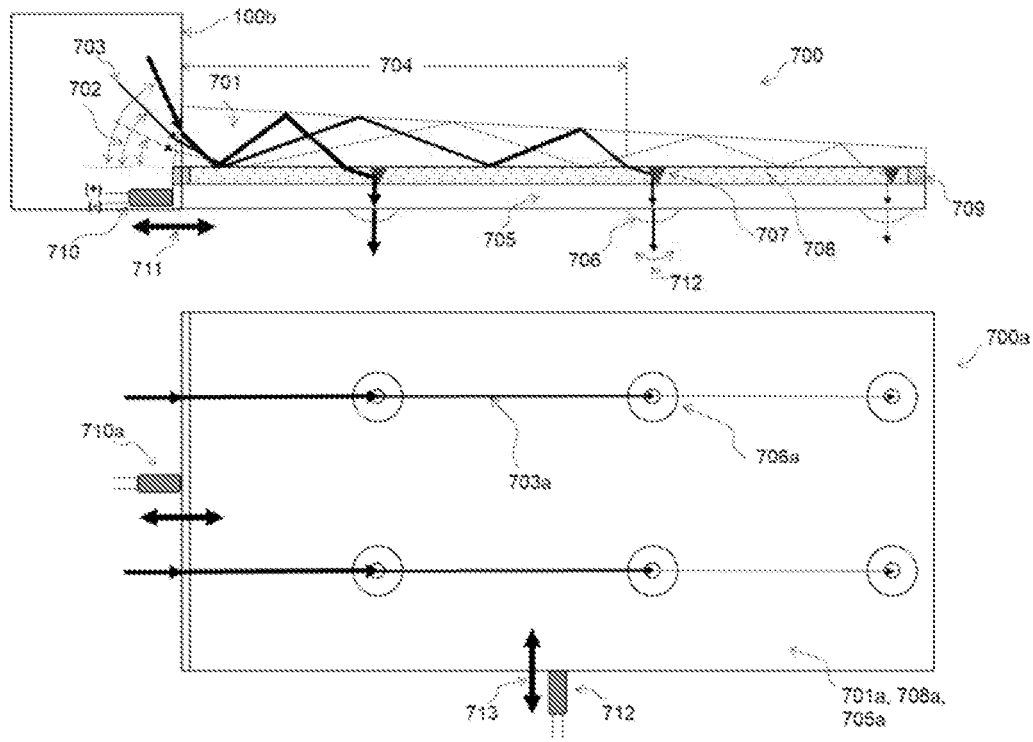
FIG. 11A depicts the preferred embodiment comprising an tapered optical waveguide light emitting layer and piezo-electric-driven decentered microlens array beam steering layer.

The image signal generating element 100$e$ processes or receives from a secondary processor digital information defining the state of each pixel (i.e. emitted beam angle) emulating a wavefront emanating from a virtual object within the wearer's natural FOV. The state of a pixel includes the pixel's intensity and color governed by the light beam modulation signal, and the pixel's location and depth within the scene government by the light beam scan signal. The image signal generating element correlates the two signals to drive the Pinbeams to project an image. FIG. 11A depicts a second embodiment 700 employing a tapered (wedge) waveguide lens 706 with edge-injected light beams 703, in which the light beam modulation signal is transmitted optically from an optical lens edge coupling to each Pinbeam on the lens (e.g. 706), via a modulated light beam that is time synchronized to the Pinbeam biaxial scan oscillations 711.

Each light beam (e.g. 703) corresponding to a designated Pinbeam on the lens surface, is injected into a wedge waveguide lens 701 at a specified fixed angle 702. The injection angle in conjunction with the waveguide taper angle and waveguide refractive properties determines the specified beam exit location along the surface of the lens (e.g. 704) by progressively increasing the angle of the internally reflected beam until the critical angle of the lens to outcoupling layer interface 708 is reached. In this figure, three exemplary light beams are depicted having a progressively larger injection angle, 702, resulting in three respective extraction points that are progressively closer to the thicker side of the tapered lens. The ability to specify beam outcoupling location along the lens surface ensures that each injected beam is coupled to a designated Pinbeam scanning element (e.g. 706). The light beams are shown to be injected laterally perpendicular to the lens edge, however, laterally non-perpendicular angles may also be used which can aid in minimizing cross-talk between Pinbeams and provide more surface area to facilitate the optical coupling between the beam carrying media (e.g. optical fiber bundle or fused fiber face plate) to the lens edge 100$e$.

In this exemplary embodiment, the modulated light beams are outcoupled at the designated Pinbeam locations from the wedge waveguide at a very shallow but uniform angle relative to the lens surface. Thus, the outcoupling layer, which may be any transparent material such as a transparent polymer or air, comprises redirecting elements, 707 for example, to assist in redirecting the beam towards the design exit pupil through the scanning layer 705. If a gas or air gap is used, the gap thickness may be governed by a spacer 709. in this example, the beams are redirected to emit at a normal angle relative to the lens surface, but any suitable redirection angle or combination of different angles may be employed when designed with the scanning element to direct the final emitted beam at the appropriate scan angle.

In lieu of or in conjunction with an optical wedge lens, extraction of light beams transmitted to each Pinbeam emission point may be assisted or facilitated using a number of optical mechanisms such as reflective or diffractive elements at each Pinbeam location. To support precise extraction, the light must maintain collimation as it transmits through the lens material 701, or otherwise achieve collimation prior to entering the beam steering layer 705 toward the designated. Pinbeam active scanning element 706. Collimation must also be maintained or achieved after exiting the scanning element such that the beam divergence does not result in a retinal image pixel that exceeds the design pixel per degree resolution. In full color display applications, care must be taken to ensure optical chromatic transmission variance of the waveguide are accounted for such that the Red, Green, and Blue components of an individual light beam image signal are delivered precisely to the designated Pinbeam light extraction point.

The tapered waveguide (or wedge waveguide) is comprised of a highly transparent material such as glass or acrylic. In this embodiment, the Pinbeam raster scan is accomplished by a microlens array fabricated on a contiguous second transparent substrate 705. Piezoelectric actuators on the side 710 and bottom 712 of the microlens substrate are actuated as a function of the image generating element 100$b$ in response to the light beam scan signal generated by the image computing element (not shown) and transmitted via the image signal transmission media (not shown). The actuators are attached to oscillate the lenses in unison along the x-axis 711 and y-axis 713, respectively, at rates that satisfy the specified display image resolution and frame rate. The central Pinbeam typically has the largest FOV coverage angle responsibility and is highest visual acuity demand region of the eye's FOV, requiring it to draw the largest number of pixels of any Pinbeam on the lens. For example, a central Pinbeam having an extended square FOV coverage angle envelope of 21.61 by 21.61 degrees (i.e. 0.1406

Steradian), at a resolution of 62 PPD would require an image frame of 1340 pixels by 1340 pixels. As a result, to facilitate a 60 Hz image frame rate, the light beam scan signal driving piezoelectric actuator along the x-axis will be 60 Hz, while the signal driving; the y-axis is 80.39 kHz.

Because the Pinbeam surface 705 is mechanically movable, the space between the Pinbeam surface and the waveguide lens 701 must be unattached and may be filled with a non-rigid material, gas, or liquid 708. if fluid or gas, the material is contained by a containing gasket and spacer 709. The material should possess the same or similar refractive index as the adjacent layers 701,705 to minimize optical aberrations of transmitted light. From the perspective of the user, the stacked substrates 701a, 708a, 705a, form a contiguous transparent lens assembly.

Figure 11B:
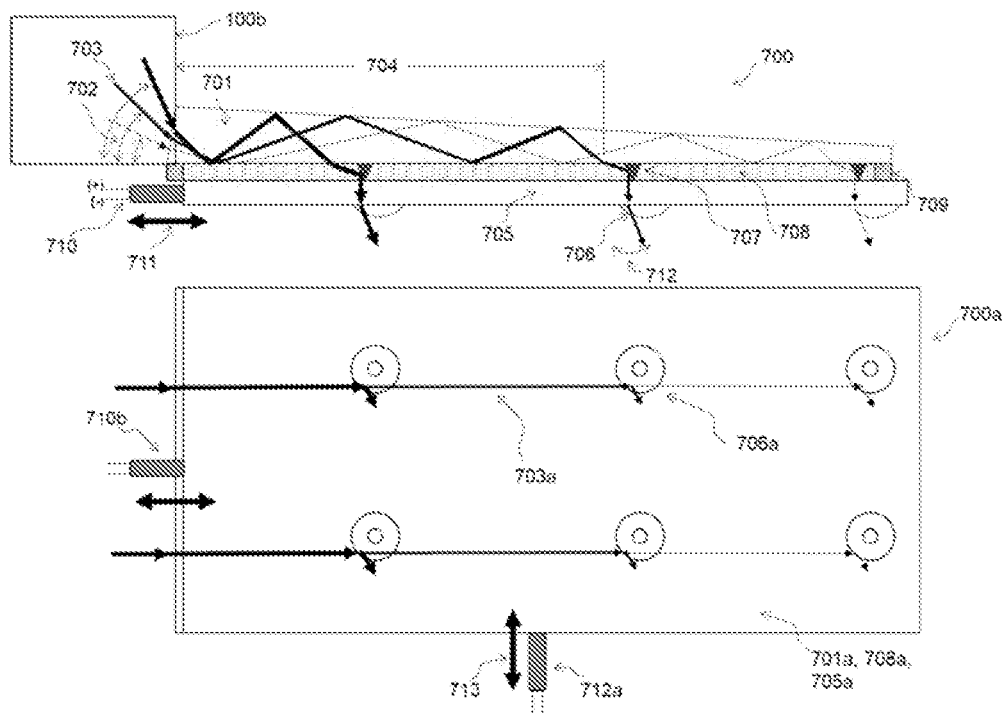
FIG. 11B shows the display state at the end of a frame scan cycle.

FIG. 11B depicts a secondary state of the tapered waveguide architecture 700, in which the image signal generating element 100b has completed a single frame scan and both actuators 710 and 712 are fully extended, resulting in a beam emission angle down and to the right relative to the lens assembly surface 701a, 708a, 705a.

Figure 12:
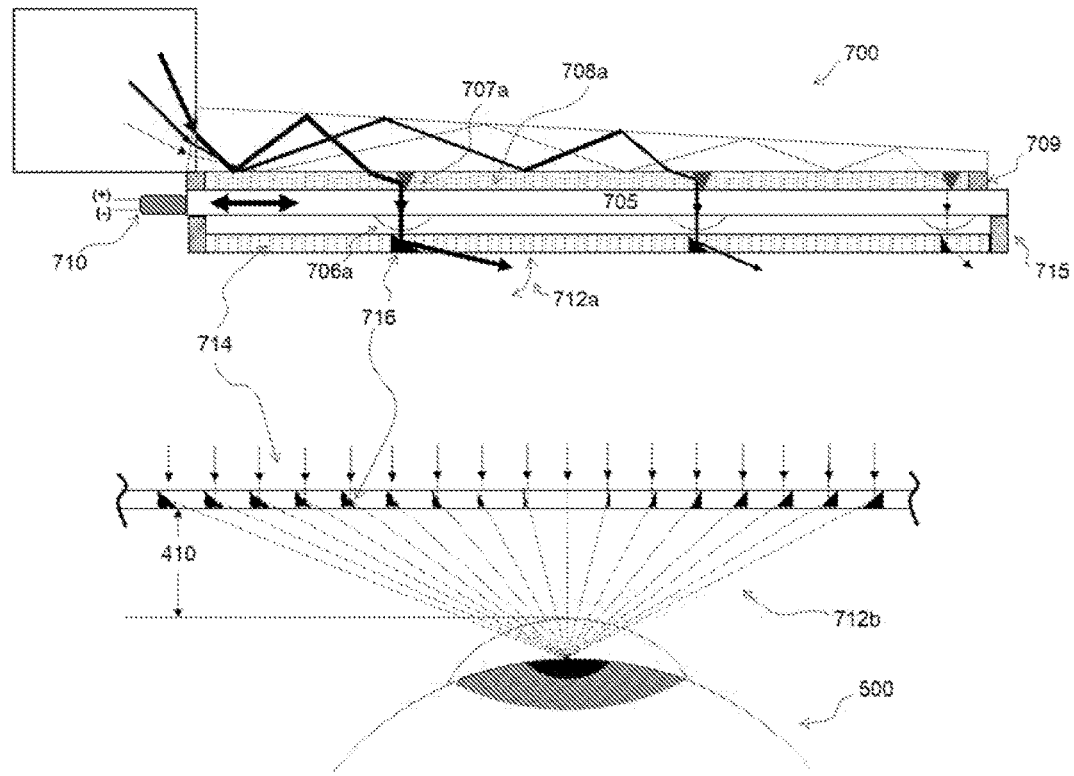
FIG. 12 depicts the tapered waveguide display and decentered microlens embodiment further comprising a fixed secondary redirecting layer used to initialize the central beam emission angle of each Pinbeam to the center of the exit pupil.

As described previously, the central angle of each Pinbeams primary coverage angle envelope must be centered on the eye pupil at rest. A cross-sectional view of this beam angle initialization is depicted in FIG. 12, bottom. This initialization of each beam angle may be accomplished by tuning the first redirecting elements 707a in association with the scanning power of the corresponding microlens 706a, or the angle can be accounted for in the design of the scanning element layer 705 itself. However, due the challenge of tailoring individual shape and or position of microlenses along the array, the preferred embodiment employs a secondary redirecting layer 714 that is analogous to the construction of the first redirecting layer with the exception that the redirecting elements 716 (e.g. micromirror array) of the secondary layer angles vary to achieve the desired beam angle initialization 712b which is a function of the design eye relief distance, 410.

Several electro-optical elements or systems may be employed as the image signal generating element 100. In one embodiment depicted in FIG. 13, the image signal is generated by a standalone non-mobile computing element 103, such as a desktop computer processor, which delivers the image signal (i.e. the light modulation signal) and power to the display via the transmission media, 102a, and receives data signals 102b from head mounted sensors required by the AR software via the same conduit. In this preferred exemplary embodiment, the transmission media includes a light engine 102c that converts electrical image light modulation data signal from the computing element into an optical signal used by the display lens Pinbeam array directly. The light engine comprises an array of light emitting elements, such as a super-luminescent Light Emitting Diode (SLD) array or LASER diode array, wherein each emitter is optically tethered (i.e. "pigtailed") to an optical fiber. The computing element processes each image tile to be displayed, the light engine parses the image tile signals to the appropriate optical fiber, each of which are dedicated to supplying the modulated light beam to a corresponding Pinbeam on one of the head mounted display lenses 700a.

In this preferred embodiment each fiber accepts optically combined light from a Red, Green, and Blue (RGB) LED chip to support full color Pinbeam image display image. Each fiber is gathered into a fiber bundle, and the bundle is used to transport the modulated light from the light engine through the temple of eyewear frames to the lens coupling element 101a, which serves to collimate light exiting from the fiber tips and direct the resulting light beams at the appropriate angle into the tapered waveguide lens 700a necessary to deliver each modulated light beam to the appropriate corresponding Pinbeam.

Further, in this embodiment, because the respective image scan signals to the x- and y-axis piezo actuators of 700a are continuous and constant, there is no need to burden the computing element to supply this signal. Instead, the signal is generated and delivered to the actuators by an ASIC or other special purpose hardwired circuitry embedded in the eyewear frames and activated with the supply of power. However, this scan signal driver must still be synchronized precisely with the computing element 103 and light engine 102c to ensure proper image tile projection from the Pinbeams.

Scene and user data acquisition sensors resident on the wearable device, such as gyrocompasses, Inertial Measurement Units (IMUS), cameras, eye tracking devices, may relay the information 102b back to the standalone processor 103 using the same tether conduit as the fiber bundle.

Figure 13:
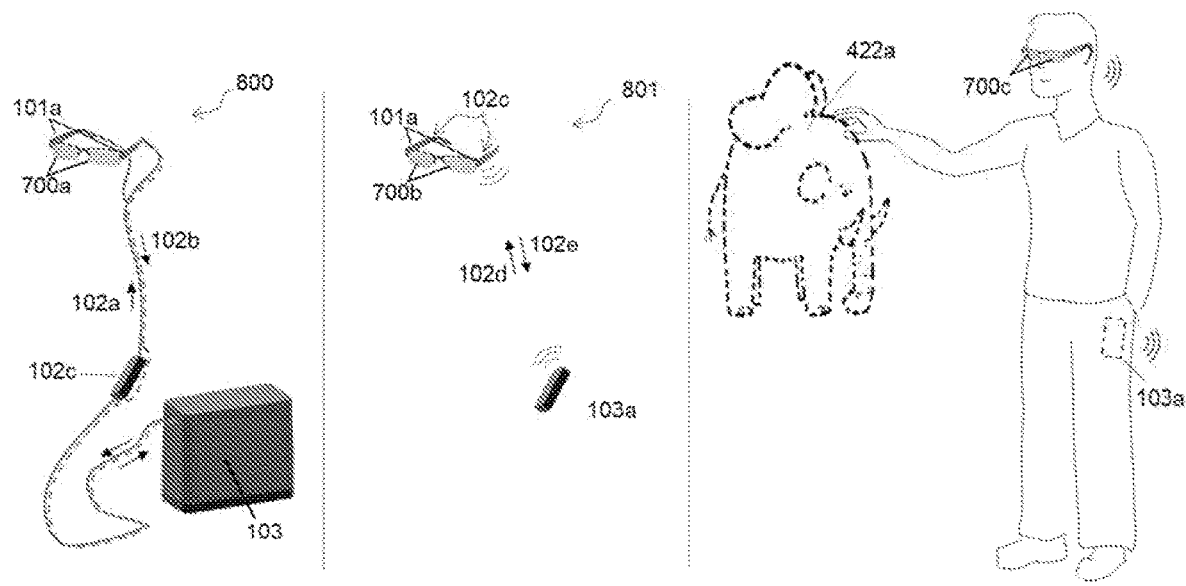
FIG. 13 depicts two exemplary display system configurations (one tethered and one untethered) and the second configuration in use.

In another embodiment depicted in FIG. 13 (middle), the image signal generating element light engine 102c comprises an array of electroactive micro-emissive elements, such as a micro-OLED, micro-LED, or micro-LCD array that is integrated locally on the wearable device itself, such as in the wearable eyeglass frame's temples. The embedded light engine is powered by a battery also embedded in the eyewear. Light output of each RGB emissive element is optically coupled to the lens edges 101a via an optical transmission media such as a fused fiber coupling (not shown), serving the same function as the fiber bundle in the previous embodiment, for optically transporting image information to the corresponding Pinbeam elements. In this embodiment, the image signal processing function may be integrated into the wearable device itself or the function may be facilitated by a stand-alone mobile processor, such as a smartphone or special purpose processor, that transmits image signal data 102d and receives device sensor data 102e to and from the wearable device wirelessly. Like the previous embodiment, the image scan signal, actuation, and power may all be embedded in the eyewear frames as well.

In yet another embodiment, the image signal generating element 100 may be comprise a system of micro-scale modulable collimated light emitting devices such as a Vertical Cavity Surface Emitting Lasers (VCSELs) with collimating optics, or micron-scale virtual point source patterned LEDs with collimating optics. These systems of collimated light emitting devices may be mounted near the edge of the head mounted display lens and coupled to the edge with light-guiding optics such as a face plate, or mounted directly to the edge of the display, serving as element 101, if emission is sufficient for directly injecting well collimated beams into the waveguide lens element 709a. Alternatively, the systems of collimated light emitting devices having a projected area smaller than the maximum design Pinbeam active area, may be mounted directly on the surface of the lens element 700a, such that each light emitting element injects the emitted beam directly (or across a short distance) to the light accepting side of each corresponding Pinbeam light steering element. In this configuration, the image generating element must still generate and deliver the light modulation signal electronically to each light emissive element on the lens via control buses comprised of transparent or semitransparent patterned conductors such as Indium Tin Oxide (ITO) or Silver (Ag).

What is claimed:

1. A head mounted display device comprising:
   head tracking sensors, and
   a head mounted display operatively coupled to the head tracking sensors, the head mounted display comprising:
   a light emitting layer configured to emit collimated light;
   an array of light steering elements optically coupled to the light emitting layer, the array of light steering elements configured to scan the light the light emitting layer emits and steer the light toward an eye pupil to form an image on a retina of the eye, interspacing between adjacent light steering elements being less than a minimum design diameter of the eye pupil thereby avoiding gaps in the image formed on the retina; and
   a light modifier that modifies paths of transmitted light to define a projected active area having a dimension that is less than a design pupil area minus a predetermined margin,
   wherein the steered light simulates a wavefront emanating from a point source close to the eye.

2. The head mounted display device of claim 1 further comprising an intensity modulator that intensity modulates the light in response to image control signals.

3. The display device of claim 2 further including a circuit that synchronizes the light beam intensity modulation with scanning by the light steering elements such that the image formed on the retina provides a polygonal raster scan pattern.

4. The head mounted display device of claim 1 wherein each light steering element and a corresponding emission point of the light emitting layer comprises a pinbeam.

5. The head mounted display device of claim 1 wherein the projected active area ensures that the array of light steering elements is effectively invisible to the eye.

6. The display device of claim 1 wherein the beam scanning elements are configured such that an angular envelope of at least one scanned beam image tile is configured to at least partially overlap the angular envelope of at least one adjacent scanned beam to generate redundant beam emission angles, and further configured to substantially match the intensity and color of beams possessing matched angles to expand a composite projected image exit pupil.

7. The display device of claim 1 further comprising an addressable emitter source that generates modulated light beams.

8. The display device of claim 1 wherein the light emitting layer is an electroluminescent device.

9. The display device of claim 1 wherein the light emitting layer comprises an optical wave guide.

10. The display device of claim 9 wherein the optical wave guide has a thickness that is tapered at an angle such that a plurality of modulated light beams injected into the edge of the waveguide are emitted at designated emission points along the surface of the waveguide.

11. The display device of claim 1 wherein the light emitting layer comprises an array of addressable electroluminescent emitters disposed at emission point.

12. The display device of claim 1 further comprising a variable light attenuation layer disposed between the light emitting layer and an observed scene, configured to actively control the amount of ambient light transmitted to the user's eye.

13. The display device of claim 1 further including a circuit that adjusts a light intensity modulation signal to restrict resolution of projected image tiles to substantially match visual acuity profile of the eye with respect to the pupil field of view.

14. A head mounted display device comprising:
   head tracking sensors, and
   a head mounted display operatively coupled to the head tracking sensors, the head mounted display comprising:
   a light emitting layer configured to emit collimated light; and
   an array of light steering elements optically coupled to the light emitting layer, the array of light steering elements configured to scan the light the light emitting layer emits and steer the light toward an eye pupil to form an image on a retina of the eye, interspacing between adjacent light steering elements being less than a minimum design diameter of the eye pupil thereby avoiding gaps in the image formed on the retina,
   wherein the steered light simulates a wavefront emanating from a point source close to the eye,
   wherein the light emitting layer comprises an optical wave guide that has a thickness that is tapered at an angle such that a plurality of modulated light beams injected into the edge of the waveguide are emitted at designated emission points along the surface of the waveguide,
   wherein the optical wave guide comprises an array of optical beam extraction elements having an interspacing matching the interspacing of the beam emission point array.

15. The display device of claim 14 wherein the optical wave guide comprises an optical fiber bundle.

16. A head mounted display device comprising:
   head tracking sensors, and
   a head mounted display operatively coupled to the head tracking sensors, the head mounted display comprising:
   a light emitting layer configured to emit collimated light;
   an array of light steering elements optically coupled to the light emitting layer, the array of light steering elements configured to scan the light the light emitting layer emits and steer the light toward an eye pupil to form an image on a retina of the eye, interspacing between adjacent light steering elements being less than a minimum design diameter of the eye pupil thereby avoiding gaps in the image formed on the retina,
   variable light attenuation layer disposed between the light emitting layer and an observed scene, configured to actively control the amount of ambient light transmitted to the user's eye, and
   a pupil dilation measurement sensor providing feedback signal to the variable light attenuation layer to thereby regulate ambient light transmission light to control pupil diameter,
   wherein the steered light simulates a wavefront emanating from a point source close to the eye.

* * * * *